US006916116B2

(12) United States Patent
Diekmann et al.

(10) Patent No.: US 6,916,116 B2
(45) Date of Patent: Jul. 12, 2005

(54) TIME OR TIME-TEMPERATURE INDICATING ARTICLES

(75) Inventors: Timothy J. Diekmann, Maplewood, MN (US); G. Marco Bommarito, Stillwater, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 10/405,446

(22) Filed: Apr. 2, 2003

(65) Prior Publication Data

US 2003/0214997 A1 Nov. 20, 2003

Related U.S. Application Data

(60) Provisional application No. 60/369,627, filed on Apr. 3, 2002.

(51) Int. Cl.[7] .............................. G01K 3/00; G01K 1/00
(52) U.S. Cl. ...................... 374/102; 374/106; 116/216; 368/327; 368/89
(58) Field of Search ................................ 374/105, 102, 374/106, 101, 104, 162; 116/207, 206, 219, 216, 308, 220; 368/89, 327

(56) References Cited

U.S. PATENT DOCUMENTS

| | | | |
|---|---|---|---|
| 2,337,534 A | 12/1943 | Barber | |
| 2,896,568 A | 7/1959 | Pryor et al. | |
| RE24,906 E | 12/1960 | Ulrich | |
| 3,018,611 A | 1/1962 | Biritz | |
| 3,046,786 A | 7/1962 | Tessem | |
| 3,055,759 A | * 9/1962 | Busby et al. | ................ 116/207 |
| 3,190,178 A | 6/1965 | McKenzie | |
| 3,243,303 A | 3/1966 | Johnson | |
| 3,414,415 A | * 12/1968 | Broad, Jr. | .................... 116/219 |
| 3,479,877 A | * 11/1969 | Allen et al. | ................. 374/106 |
| 3,480,402 A | 11/1969 | Jackson | |
| 3,520,124 A | 7/1970 | Myers | |
| 3,620,677 A | * 11/1971 | Ayers | ........................... 422/56 |
| 3,632,695 A | 1/1972 | Howell | |
| 3,926,402 A | 12/1975 | Heenan | |
| 3,954,011 A | 5/1976 | Manske | |
| 3,996,007 A | * 12/1976 | Fang et al. | ................... 422/58 |
| 3,999,946 A | 12/1976 | Patel et al. | |
| 4,025,159 A | 5/1977 | McGrath | |

(Continued)

FOREIGN PATENT DOCUMENTS

| | | |
|---|---|---|
| DE | 3717025 | 8/1988 |
| FR | 2702046 | 9/1994 |
| FR | 2789486 | 8/2000 |

(Continued)

OTHER PUBLICATIONS

Dee Lynn Johnson, Indicating Devices, in *The Wiley Encyclopedia of Packaging Technology*, pp. 400–406 (John Wiley & Sons, 1986).

(Continued)

*Primary Examiner*—Diego Gutierrez
*Assistant Examiner*—Mirellys Jagan
(74) *Attorney, Agent, or Firm*—Lisa P. Fulton

(57) ABSTRACT

Time or time-temperature indicating articles are described comprising a housing enclosing: (a) a first fluid reservoir at least partially filled with a first fluid; (b) a substrate comprising a plurality of channels; (c) a second fluid reservoir in fluid communication with at least one channel of the substrate; and (d) a barrier located between the first fluid reservoir and the second fluid reservoir. The article can be manipulated at a desired point in time by opening the barrier to allow at least a portion of the fluid to flow from the first reservoir to the second reservoir and to contact at least one channel of the substrate. The article is designed to provide an indication of the progress of the fluid as it moves through the channels of the substrate.

21 Claims, 13 Drawing Sheets

U.S. PATENT DOCUMENTS

| | | | |
|---|---|---|---|
| 4,148,272 A | * 4/1979 | Wetzold | ............... 116/219 |
| 4,154,107 A | 5/1979 | Giezen et al. | |
| 4,195,058 A | 3/1980 | Patel | |
| 4,212,153 A | 7/1980 | Kydonieus et al. | |
| 4,212,393 A | 7/1980 | Lenkoff | |
| 4,222,268 A | * 9/1980 | Greenberg et al. | ............... 374/105 |
| 4,229,813 A | 10/1980 | Lilly et al. | |
| 4,292,916 A | 10/1981 | Bradley et al. | |
| 4,349,598 A | 9/1982 | White | |
| 4,382,700 A | 5/1983 | Youngren | |
| 4,408,557 A | 10/1983 | Bradley et al. | |
| 4,428,321 A | 1/1984 | Arens | |
| 4,432,630 A | 2/1984 | Haas | |
| 4,432,656 A | 2/1984 | Allmendinger | |
| 4,542,982 A | 9/1985 | Haas | |
| 4,588,258 A | 5/1986 | Hoopman | |
| 4,629,330 A | 12/1986 | Nichols | |
| 4,643,122 A | 2/1987 | Seybold | |
| 4,779,120 A | 10/1988 | Haas | |
| 4,812,053 A | 3/1989 | Bhattacharjee | |
| 4,895,428 A | 1/1990 | Nelson et al. | |
| 4,903,254 A | 2/1990 | Haas | |
| 4,917,503 A | 4/1990 | Bhattacharjee | |
| 4,938,563 A | 7/1990 | Nelson et al. | |
| 4,987,849 A | 1/1991 | Sherman | |
| 5,045,283 A | 9/1991 | Patel | |
| 5,053,339 A | 10/1991 | Patel | |
| 5,058,088 A | 10/1991 | Haas et al. | |
| 5,066,098 A | 11/1991 | Kult et al. | |
| 5,107,470 A | 4/1992 | Pedicano et al. | |
| 5,120,137 A | 6/1992 | Ou-Yang | |
| 5,138,488 A | 8/1992 | Szczech | |
| 5,317,980 A | 6/1994 | Bono Coraggioso | |
| 5,364,132 A | 11/1994 | Haas et al. | |
| 5,368,905 A | 11/1994 | Ohno | |
| 5,393,787 A | 2/1995 | Nestegard et al. | |
| 5,404,834 A | * 4/1995 | Murphy | ............... 116/216 |
| 5,446,705 A | 8/1995 | Haas et al. | |
| 5,450,235 A | 9/1995 | Smith et al. | |
| 5,514,120 A | 5/1996 | Johnston et al. | |
| 5,650,215 A | 7/1997 | Mazurek et al. | |
| 5,667,303 A | 9/1997 | Arens et al. | |
| 5,691,846 A | 11/1997 | Benson, Jr. et al. | |
| 5,728,446 A | 3/1998 | Johnston et al. | |
| 5,959,777 A | 9/1999 | Whitehead | |
| 5,999,307 A | 12/1999 | Whitehead et al. | |
| 6,080,243 A | * 6/2000 | Insley et al. | ............... 134/21 |
| 6,244,208 B1 | * 6/2001 | Qiu et al. | ............... 116/207 |
| 6,270,122 B1 | * 8/2001 | Shadle et al. | ............... 283/95 |
| 6,440,334 B2 | 8/2002 | Currens et al. | |
| 6,503,564 B1 | * 1/2003 | Fleming et al. | ............... 427/255.6 |
| 6,741,523 B1 | * 5/2004 | Bommarito et al. | ............... 374/102 |
| 2004/0240324 A1 | * 12/2004 | Ibitsky et al. | ............... 368/327 |

FOREIGN PATENT DOCUMENTS

| | | |
|---|---|---|
| JP | 08110384 | 4/1996 |
| WO | WO 99/06589 | 2/1999 |
| WO | WO 99/65541 | 12/1999 |
| WO | WO 99/65542 | 12/1999 |
| WO | WO 99/65593 | 12/1999 |
| WO | WO 99/65595 | 12/1999 |
| WO | WO 99/65664 | 12/1999 |
| WO | WO 99/65704 | 12/1999 |
| WO | WO 99/66282 | 12/1999 |
| WO | WO 00/42958 | 7/2000 |
| WO | WO 01/88634 A1 | 11/2001 |

OTHER PUBLICATIONS

Theodore P. Labuza, *Shelf–Life Dating of Food*, pp. 41–87 (Food & Nutrition Press, Inc. 1982).

M. Richter et al., Sensors and Actuators, A–62, 1997, 480–483.

ASTM Designation: E 808–93b, Standard Practice for Describing Retroreflection, pp. 791–795.

* cited by examiner

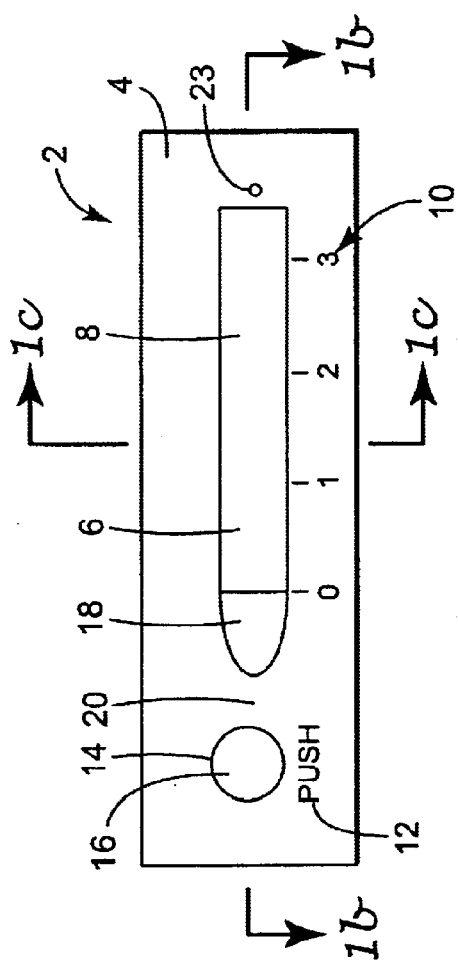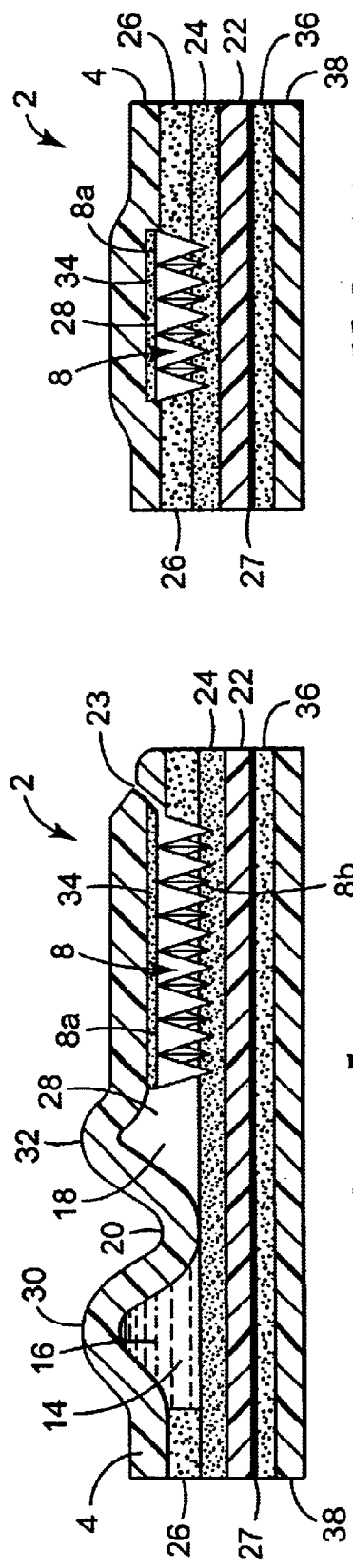

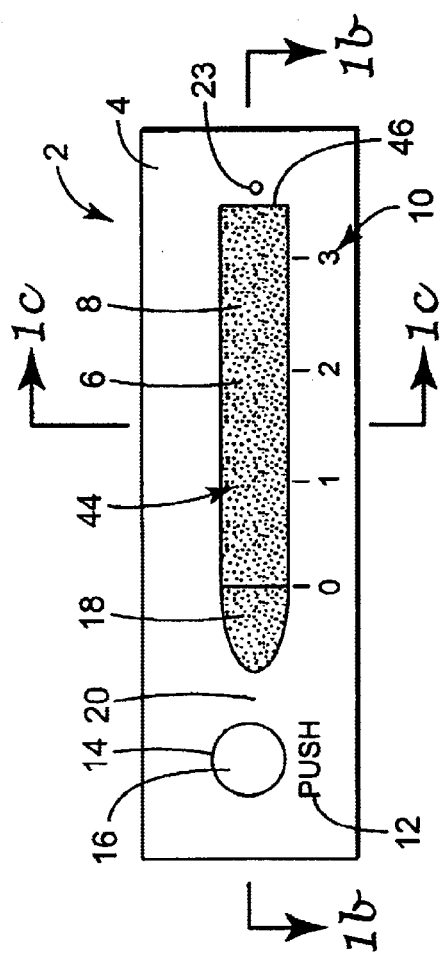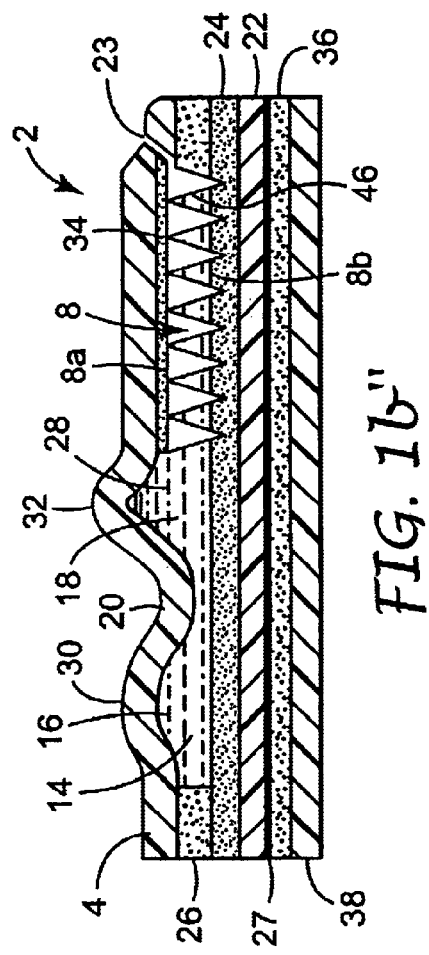

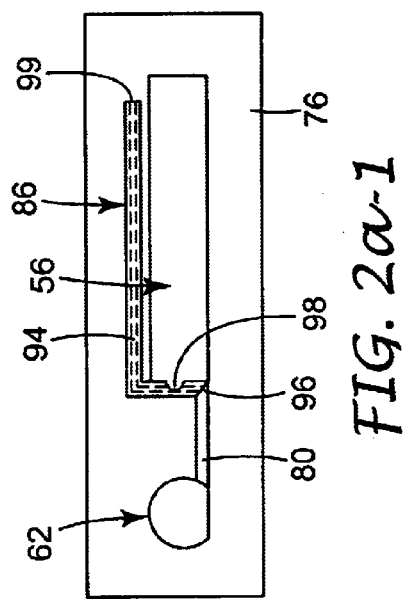
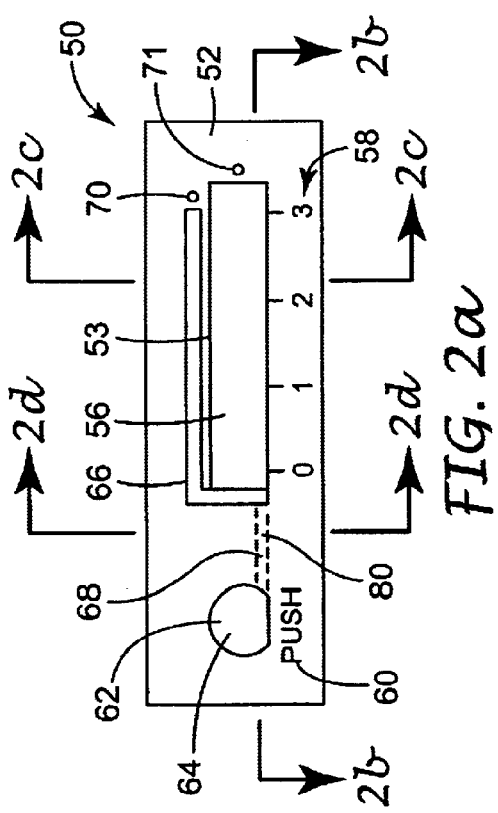
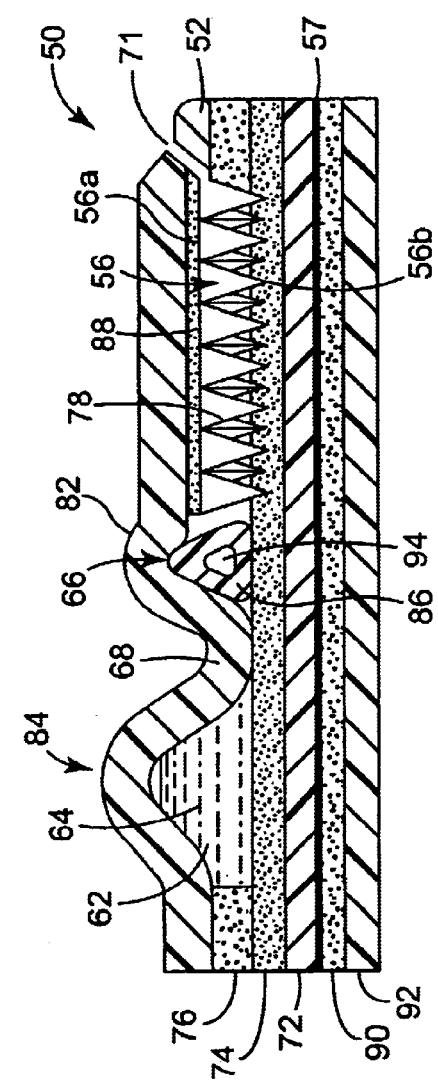

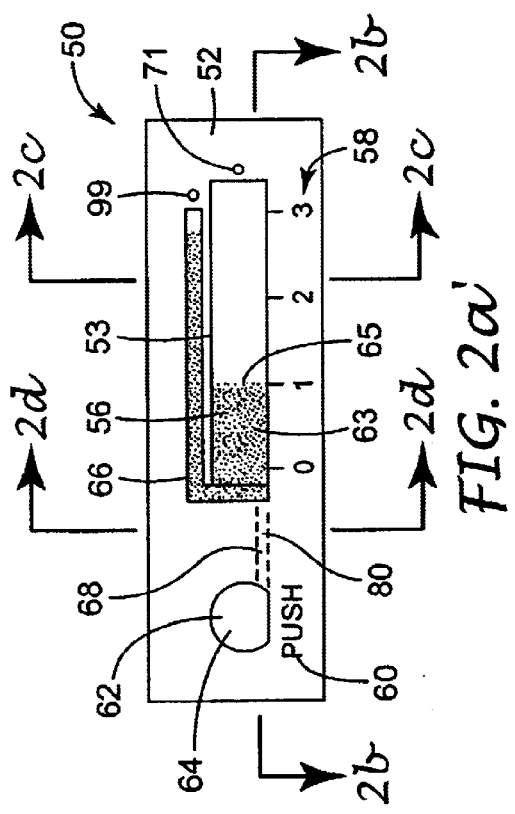
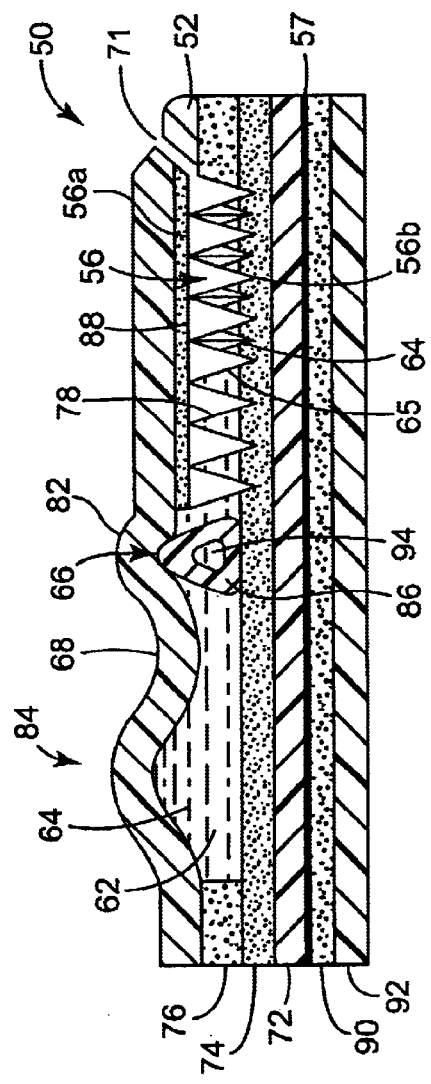
FIG. 2a'
FIG. 2b'

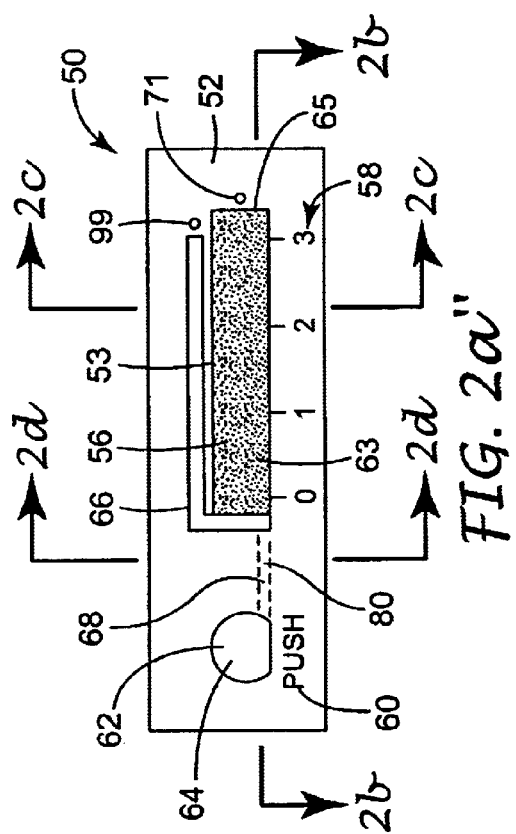
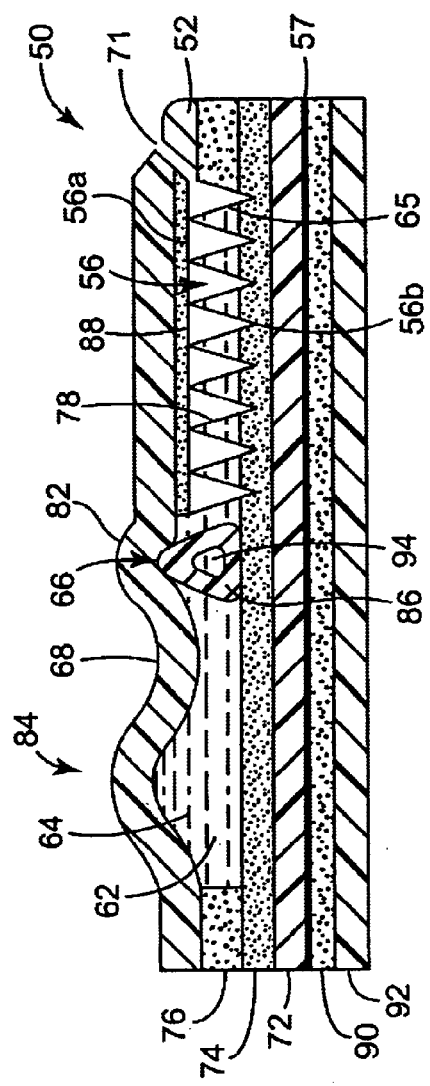
FIG. 2a"
FIG. 2b"

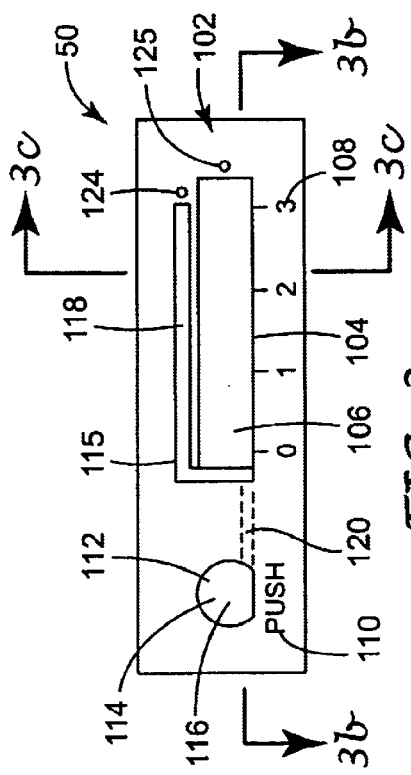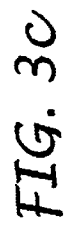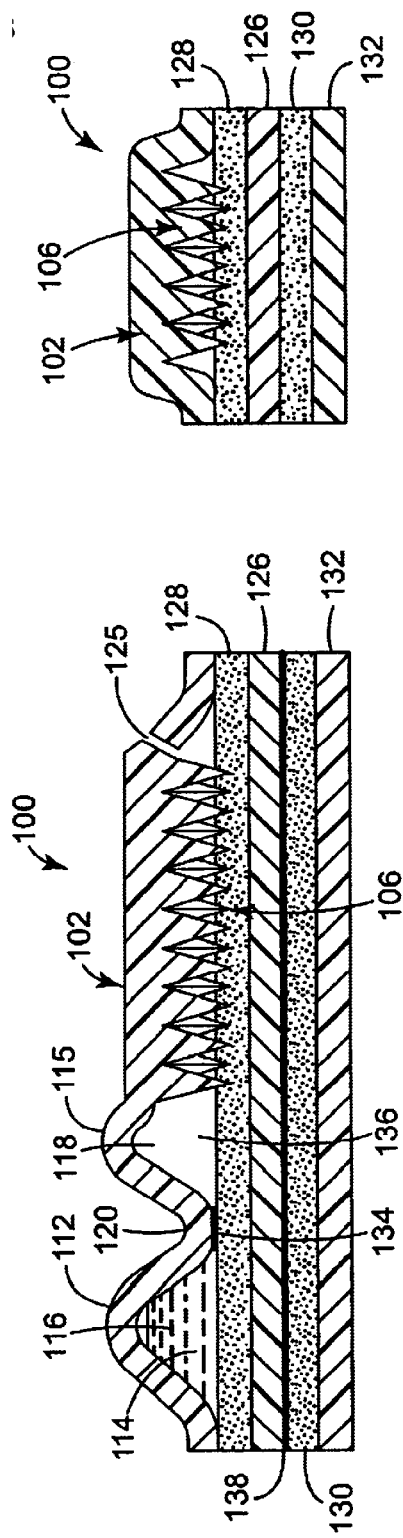
FIG. 3a
FIG. 3b
FIG. 3c

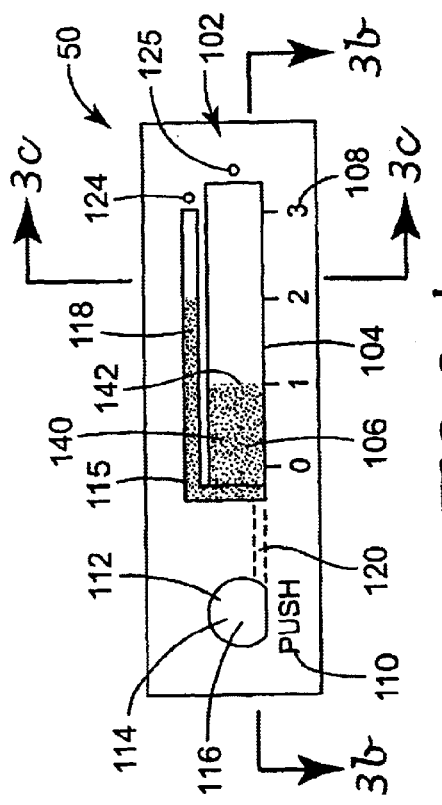
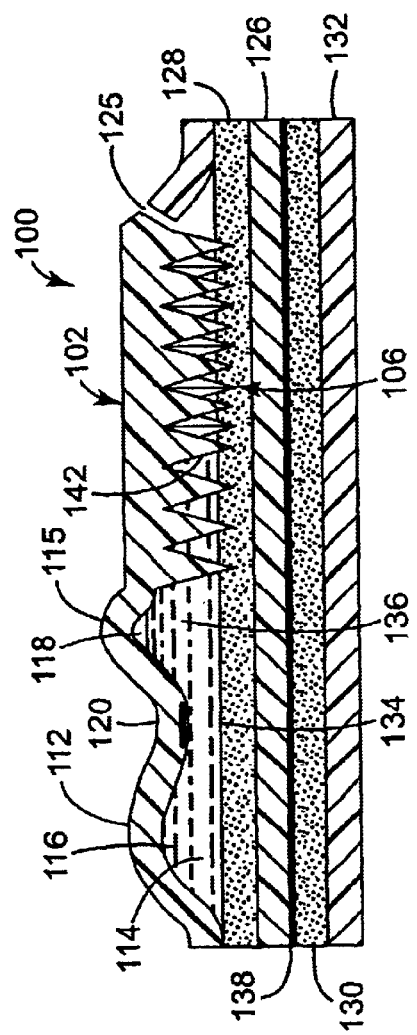
FIG. 3a'
FIG. 3b'

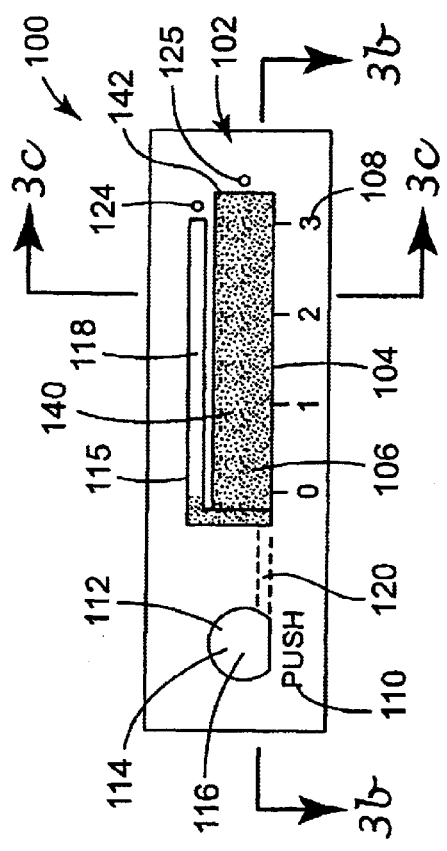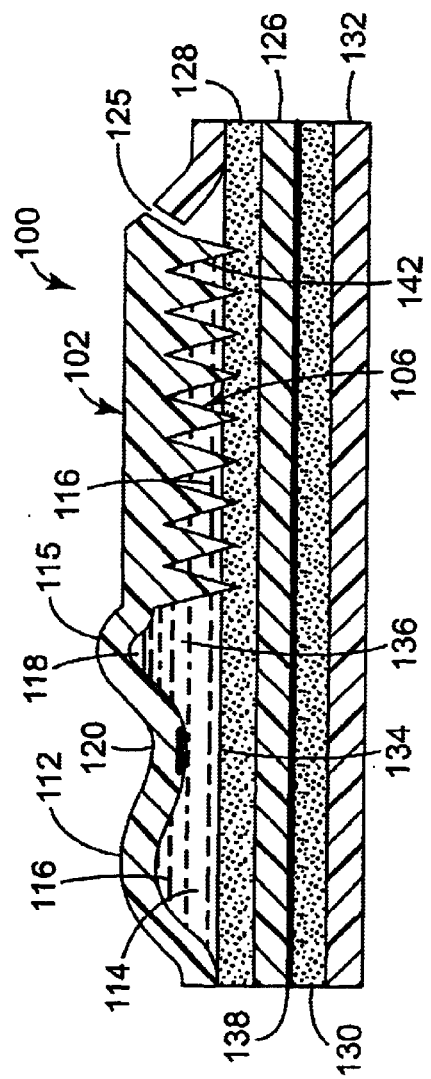

TIME OR TIME-TEMPERATURE INDICATING ARTICLES

This application claims the benefit of U.S. Provisional Application No. 60/369,627, filed Apr. 3, 2002.

SUMMARY

The present invention provides time or time-temperature indicating articles comprising a housing enclosing (a) a first fluid reservoir at least partially filled with a first fluid; (b) a substrate comprising a plurality of channels; (c) a second fluid reservoir in fluid communication with at least one channel of the substrate; and (d) a barrier located between the first fluid reservoir and the second fluid reservoir. The article can be manipulated at a desired point in time by opening the barrier, for example by applying finger pressure to the first reservoir to allow at least a portion of the fluid to flow from the first reservoir to the second reservoir and to contact at least one channel of the substrate. The article is designed to provide an indication of the progress of the fluid as it moves through the channels of the substrate. The movement of the fluid through the channels of the substrate provides the time or time-temperature measuring function.

In certain embodiments of the invention the substrate has a microstructured surface comprising a plurality of channels having a predetermined size and shape. The microstructured substrate may be a retroreflective material such as cube-corner retroreflective material. The substrate may be adhesively bonded to the top cover of the article or the microstructured surface may be integrally formed in the lower surface of the top cover of the article. In certain other embodiments, the substrate comprises a plurality of channels of random size and shape.

In certain embodiments, the volume of the second reservoir is greater than the volume of the first reservoir. Preferably, the second reservoir is sized so as to provide a capillary pressure when in contact with a fluid that is less than the capillary pressure in the channels of the substrate.

In certain embodiments, the second reservoir is compression resistant. For example, the second reservoir may comprise a compression resistant elongated tube having an inlet opening, an internal passageway for the flow of fluid, a first outlet that is in fluid communication with the substrate, and a second outlet that is located proximate a vent hole. The compression resistant tube may comprise, for example, glass, metal or polymer. A compression resistant second reservoir functions to prevent or minimize an external load applied to the article from substantially affecting the time or time-temperature accuracy of the article.

BRIEF DESCRIPTION OF THE DRAWINGS

FIG. 1$b$ illustrates cross-sectional view of the article of FIG. 1$a$ taken along line 1$b$—1$b$.

FIG. 1$c$ illustrates a cross-sectional view of the article of FIG. 1$a$ taken along line 1$c$—1$c$.

FIG. 1$a'$ illustrates a top view of an embodiment of an article of the invention subsequent to activation but prior to expiration.

FIG. 1$b'$ illustrates cross-sectional view of the article of FIG. 1$a'$ taken along line 1$a'$—1$a'$ subsequent to activation but prior to expiration.

FIG. 1$a''$ illustrates a top view of an embodiment of an article of the invention after expiration.

FIG. 1$b''$ illustrates cross-sectional view of the article of FIG. 1$a''$ taken along line 1$b''$—1$b''$ after expiration.

FIG. 2$a$-1 illustrates a top view of the article of FIG. 2$a$ with the top film removed.

FIG. 2$b$ illustrates cross-sectional view of the article of FIG. 2$a$ taken along line 2$a$—2$a$.

FIG. 2$c$ illustrates a cross-sectional view of the article of FIG. 2$a$ taken along line 2$c$—2$c$.

FIG. 2$d$ illustrates a cross-sectional view of the article of FIG. 2$a$ taken along line 2$d$—2$d$.

FIG. 2$a'$ illustrates a top view of an embodiment of an article of the invention subsequent to activation but prior to expiration.

FIG. 2$b'$ illustrates cross-sectional view of the article of FIG. 2$a'$ taken along line 2$b'$—2$b'$ subsequent to activation but prior to expiration.

FIG. 2$a''$ illustrates a top view of an embodiment of an article of the invention after expiration.

FIG. 2$b''$ illustrates cross-sectional view of the article of FIG. 2$a''$ taken along line 2$b''$—2$b''$ after expiration.

FIG. 3$a$ illustrates a top view of an embodiment of an article of the invention prior to activation.

FIG. 3$b$ illustrates cross-sectional view of the article of FIG. 3$a$ taken along line 3$a$—3$a$.

FIG. 3$c$ illustrates a cross-sectional view of the article of FIG. 3$a$ taken along line 3$c$—3$c$.

FIG. 3$a'$ illustrates a top view of an embodiment of an article of the invention subsequent to activation but prior to expiration.

FIG. 3$b'$ illustrates cross-sectional view of the article of FIG. 3$a'$ taken along line 3$b'$—3$b'$ subsequent to activation but prior to expiration.

FIG. 3$a''$ illustrates a top view of an embodiment of an article of the invention after expiration.

FIG. 3$b''$ illustrates cross-sectional view of the article of FIG. 3$a''$ taken along line 3$b''$—3$b''$ after expiration.

FIG. 8$b$ illustrates a top plan view of the substrate of FIG. 8.

FIG. 8$c$ illustrates a cross-sectional view of the substrate of FIG. 8$b$ taken along line 8$c$—8$c$.

DETAILED DESCRIPTION

Figure 1A:
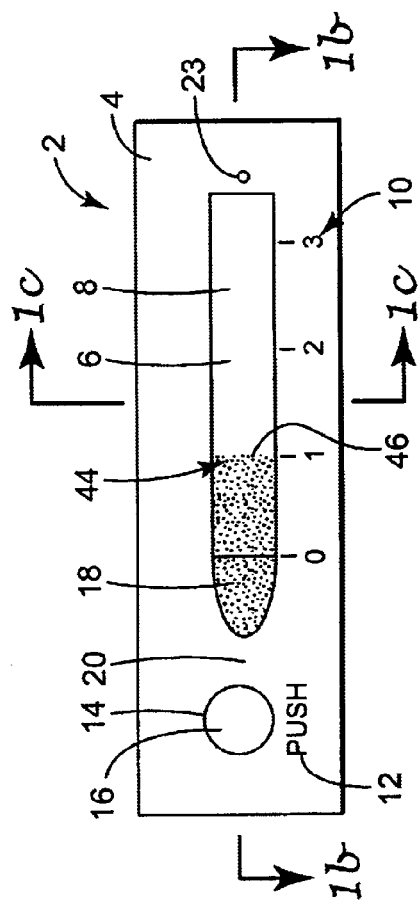
FIG. 1$a$ illustrates a top view of an embodiment of an article of the invention prior to activation.

The present invention provides time or time-temperature indicating articles comprising a housing enclosing: (a) a first fluid reservoir at least partially filled with a first fluid; (b) a substrate comprising a plurality of channels; (c) a second fluid reservoir in fluid communication with at least one channel of the substrate; and (d) a barrier located between the first fluid reservoir and the second fluid reservoir. Upon activation, at least a portion of the fluid in the first reservoir is forced to flow into the second reservoir where it contacts the substrate to activate the article for time or time-temperature indication.

The presence of a second reservoir located between the first reservoir and the substrate improves the accuracy of the time or time-temperature articles of the present invention over similar devices that do not include a second reservoir. For example, the presence of a second reservoir having a volume sufficient to accommodate the fluid of the first reservoir advantageously prevents the fluid from being forced directly into the substrate upon activation by providing a "buffer" volume between the first reservoir and the substrate. Forcing fluid under pressure into the substrate could potentially lead to inaccurate time or time-temperature readings from the article. In addition, the second reservoir is designed to be in permanent fluid communication with the substrate, thereby eliminating any chance that the substrate could be "cut-off" from the fluid after activation of the article. In certain embodiments the second reservoir is compression resistant. A compression resistant second reservoir functions to prevent or minimize an external load applied to the article from substantially affecting the time or time-temperature accuracy of the article.

The various components of a time or time-temperature article of the invention will now be described in detail.

Substrates useful in articles of the present invention may be divided into two general classes. A first class of substrates may be described as having a microstructured surface comprising channels having a predetermined size and shape. A second class of substrates includes those having channels that are random (i.e., not predetermined) in size and shape, for example, as would be found in webs, fabrics, porous materials, porous papers, porous membranes, etc.

Microstructured substrates useful according to the invention are substrates having a microstructured surface, wherein the microstructured surface defines a plurality of channels. Such a substrate has a predetermined channel pattern, wherein the maximum depth and width of the channels is less than about 1,000 microns. The channels may or may not be interconnected. The channels may, optionally, be formed from a series of projections. The definition is meant to exclude webs, fabrics, porous materials, porous papers, porous membranes, etc., which may have channels, but which channels are not predetermined. Preferably the channel portion of the substrates of the invention is regular, orderly, and non-random. Preferably the channels are in an array. In some embodiments, each channel would be substantially identical or identical to an adjacent channel. In some embodiments, one may wish to have differing channel geometries and/or sizes, either widthwise across the channel surface or lengthwise down the channeled surface.

The substrates useful according to the invention are typically flexible. Articles with flexible substrates may be easier to attach to an intended surface. However, semi-rigid and rigid substrates also may be useful according to the invention. Likewise, the articles of the invention are typically flexible. However, the articles of the invention may also be semi-rigid or rigid.

The substrate may or may not be retroreflective depending on the particular embodiment. Examples of useful non-retroreflective substrates include, but are not limited to, microstructured substrates having a series of channels therein wherein the channels are linear, parallel, and closely spaced. The use of a retroreflective microstructured substrate may provide a number of advantages to the articles of the invention. These include the preferably highly visible fluid flow front with the use of the retroreflective substrate when the article is designed to be used in such a manner in which the fluid frustrates total internal reflection in the retroreflective substrate.

It is preferable that the microstructured substrate and/or other materials used in the articles do not absorb the fluid, so as not to interfere with the fluid flow (i.e., the substrate and other components of the article, which the fluid may come in contact with, should preferably be essentially fluid impermeable, most preferably fluid impermeable). Preferably the substrate and/or other materials used in the article, which the fluid may come into contact with, (such as the cover, for example) are essentially non-absorbent, most preferably non-absorbent with respect to the fluid with which they are used. Preferably also the fluid flow is only through the channels of the substrate and there is essentially no diffusion, most preferably no diffusion, of the fluid into the substrate itself (or any other components of the article with which the fluid may come into contact). Thus, the fluid most preferably does not become absorbed, diffuse into, or permeate the substrate itself or other components of the article it may come into contact with.

The flow of the fluid through the substrate is preferably via passive flow. That is, it should preferably be through capillary action and optionally gravitational effects, although preferably any gravitational effects are minimal or nonexistent. The flow of the fluid should preferably not be "active," (i.e., caused by devices such as pumps, external vacuum sources, etc.).

The substrate can have a number of different shapes. The substrate may be symmetrical or asymmetrical. The substrate may, for example, have a shape selected from the group consisting of rectangular, square, trapezoidal, ring, triangular, etc., shapes. A rectangular shape can be useful since it is easy to cut and it is easy to design an article having a rectangular shaped substrate. However, the fluid flow rate decreases as the fluid progresses through the rectangular substrate. If time markings are desired on an article having a rectangular substrate (or any substrate for that matter in which the fluid flow rate decreases with time), typically they should not be evenly spaced due to the decreasing fluid flow rate. In such a case, the markings would typically be positioned closer together toward the end of the fluid flow path (See FIGS. 1a and 3a, for example). In order to avoid this decrease in fluid flow rate and to have more evenly spaced time markings, one can potentially design the substrate such that its channels narrow near the end of the fluid flow path.

If the substrate shape is that of a rectangle, square, trapezoid, triangle, etc., the fluid would typically be positioned in a manner such that, upon activation, the fluid would contact an edge or end of the substrate at a location where channel openings or inlets are present. Although it is not required, typically channel openings are located on at least one edge or side of a substrate and the channels extend through the entire substrate surface to another end or edge of the substrate (typically an opposite end or edge). When the substrate selected is rectangular in shape, the components are typically positioned such that the flow path of the fluid corresponds with the longest side of the rectangle. If the substrate is ring shaped, one may wish, for example, to position the fluid and a barrier in the center of the ring-shaped substrate such that, once the barrier is removed, the fluid flows radially from the inner ring perimeter toward the outer ring perimeter. However, it may be possible to design an article in a manner such that the fluid contacts the substrate away from an end or edge (more towards the center, for example) as long as sufficient fluid contacts the channels so that it can flow through the channels in a manner in which an observer can determine the progress of the fluid therethrough.

As discussed previously, the substrate of the article contains channels therein. The channels may be interconnected for a more even fluid flow front. The channels are typically provided on an exposed surface of the substrate. However, it may be possible to provide the channels internal to the substrate by joining together two microstructured surfaces to provide the desired types of channels for the fluid to flow through.

A substrate having internal channels can potentially be prepared by joining together two sheets, each sheet having a pattern on one side thereof. The resultant substrate may or may not be retroreflective depending on the patterns joined together. The sheets can be joined together such that the patterned sides form a channel system through which the fluid can flow, typically via capillary action. These sheets can be held together by a variety of means such as by a clamp, a cover, an adhesive, hot-melt bonding, etc.

Depending on the substrate shape and channel design, it may be that a small amount of fluid could leak out of the substrate sides (or edges) as it moves along the fluid flow path. Such fluid, which leaks out, could potentially reenter the substrate channels further along the fluid flow path contributing to a somewhat less than even fluid flow front. Thus, in some cases it is preferred to seal the edges or sides of the substrate as long as the edge or area which allows fluid entry is unsealed and the edge or area toward which the fluid flows is unsealed to ensure a more uniform fluid flow front.

In an alternative and preferred embodiment of the substrate, an outer surface of the substrate contains the channels therein. An opposing outer surface of the substrate may optionally also contain channels. It is preferable, but not required, that the opposing outer surface be free of channels. It is typically expensive to provide a pattern on a substrate surface and it would not be cost effective to have channels on both surfaces when it is not necessary that both sides contain channels. Preferably in such an embodiment the opposing outer surface of the substrate is flat and free of channels and bonded to a cover in such a manner as to avoid fluid flow between the cover and the smooth side of the substrate. However, as mentioned previously, the article should be constructed such that, upon activation, the fluid contacts the surface of the substrate that has channels therein in a manner such that the fluid can flow within the channels. It is preferable that fluid flow along only one microstructed surface of the substrate so as not to provide multiple fluid flow fronts, which could be confusing to an observer. However, there may be situations for a particular article wherein multiple fluid flow fronts on the same substrate may be desirable.

The channels of the microstructured substrate can have a variety of shapes. Typically the channels within the substrate are similarly shaped. Examples of useful channel cross-sectional shapes include, but are not limited to, the following: v-shaped channels, u-shaped channels, semi-circle-shaped channels, and square unshaped channels. The channels, when viewed from above, can be linear or non-linear. For example, they may be straight, curved, twisted, crooked, tortuous, etc. The channels may optionally be formed by a series of geometric projections, wherein the paths between the projections become the channels. This would be the case for retroreflective cube-corner sheeting discussed later herein. Preferably the channels of the substrate are planar.

Typically the depth of the channels range from about 5 to less than about 1,000 microns, more typically about 10 to about 500 microns, preferably about 25 to about 200 microns, and most preferably about 25 to about 100 microns. Typically the width of the channels range from about 5 to about less than about 1,000 microns, more typically about 10 to about 500 microns, preferably about 25 to about 250 microns. Typically the spacing of the channels is such that a channel is within about 5 to less than about 1,000 microns of another channel, more typically about 10 to about 500 microns, and preferably about 10 to about 250 microns.

The shape, length, and number of channels on the substrate can vary depending on a number of factors. These include, for example, the length of time one desires for the fluid to run through the substrate, the fluid to be used with the substrate, and the level to which the fluid flow should or should not be influenced by forces other than capillary forces (such as gravity). To design an article substantially unaffected by gravity, one should preferably utilize a substrate with sufficiently small channels.

The substrates useful according to the invention are microstructured. A variety of different classes and types of retroreflective and non-retroreflective channel-containing microstructured substrates are useful in embodiments of the invention. Preferably, the microstructured substrate retains its geometry and surface characteristics upon exposure to the fluids used in the article of the invention.

Examples of useful nonretroreflective substrates include, but are not limited to, those disclosed in U.S. Pat. No. 5,728,446 (Johnston) and U.S. Pat. No. 5,514,120 (Johnston). These substrates provide for liquid management films that facilitate desired rapid and uniform anisotropic or directionally dependent distribution of liquids and absorbent articles using these films. These liquid management films have at least one microstructured surface with a plurality of primary grooves to promote the unidirectional spreading of the liquids. These primary grooves may also contain secondary grooves as in U.S. Pat. No. 5,728,446. However, these additional secondary grooves are less preferred for use in the current invention as they could contribute to a less even fluid flow front.

The microstructured flow channels of non-retroreflective microstructured substrates are, in some embodiments, substantially parallel and linear over at least a portion of their length. In all substrate embodiments, however, the channels are preferably interconnected. The channels can be easily formed from thermoplastic materials by casting, profile extrusion or embossing, preferably by casting or embossing.

The non-retroreflective microstructured substrates are preferably formed from any thermoplastic materials suitable for casting, profile extrusion, or embossing including, for example, polyolefins, polyesters, polyamides, poly(vinyl chloride), polymethyl methacrylate, polycarbonate, nylon, etc. Polyolefins are preferred, particularly polyethylene or polypropylene, blends and/or copolymers thereof, and copolymers of propylene and/or ethylene with minor proportions of other monomers, such as ethylene/vinyl acetate. Polyolefins are preferred because of their excellent physical properties, ease of processing, and typically lower cost than other thermoplastic materials having similar characteristics.

Polyolefins readily replicate the surface of a casting or embossing roll and are also readily profile extruded. They are tough, durable and hold their shape well, thus making such films easy to handle after the casting or embossing process. Alternatively, the microstructured substrate can be cast from curable resin materials such as acrylates or epoxies, and cured by exposure to heat, ultraviolet (UV), or E-beam radiation. Most likely, the microstructured substrates having retroreflective and/or other optical properties discussed in greater detail below can also be made by the procedures described above.

Another class of microstructured substrates useful in embodiments of this invention are retroreflective substrates. Retroreflective materials have the property of redirecting light incident on the material back toward its originating source. In situations where the retroreflective sheeting may need to flex or conform to a surface, a sheeting is preferably selected, which does so without sacrificing retroreflective performance.

There are two common types of retroreflective sheeting: microsphere-based sheeting and cube-corner sheeting. Microsphere-based sheeting, sometimes referred to as "beaded" sheeting, is well known in the art and employs a multitude of microspheres, typically at least partially embedded in a binder layer and having associated specular or diffuse reflecting materials (e.g., pigment particles, metal flakes or vapor coats, etc.) to retroreflect incident light. Illustrative examples of such retroreflectors are disclosed in U.S. Pat. No. 3,190,178 (McKenzie), U.S. Pat. No. 4,025,159 (McGrath), and U.S. Pat. No. 5,066,098 (Kult). Microsphere based sheeting does not have a regular predetermined channel pattern and is not considered to be "a substrate, the substrate having a microstructured surface, wherein the microstructured surface defines a plurality of channels" as that term is used herein.

Basic cube-corner retroreflective sheeting is well-known to those of ordinary skill in the retroreflective arts and falls within the definition of "a substrate, the substrate having a microstructured surface, wherein the microstructured surface defines a plurality of channels" as used herein. Such sheetings are frequently used on road signs, safety garments and the like. The sheeting comprises a substantially planar base surface and a structured surface comprising a plurality of cube-corner elements opposite the base surface. Each cube-corner element comprises three mutually substantially perpendicular optical faces that intersect at a single reference point, or apex. Light incident on the planar base surface of the sheeting is refracted at the base surface of the sheeting, transmitted through the sheeting, reflected from each of the of the three perpendicular cube-corner optical faces, and redirected toward the light source. The symmetry axis, also called the optical axis, is the axis that extends through the cube-corner apex and forms an equal angle with the three optical surfaces of the cube-corner element. Cube-corner elements typically exhibit the highest optical efficiency in response to light incident on the base of the element roughly along the optical axis. The amount of light retroreflected by a cube-corner retroreflector drops as the incidence angle deviates significantly from the optical axis.

Manufacturers of retroreflective sheeting design the retroreflective sheeting to exhibit its peak performance in response to light incident on the sheeting at a specific angle of incidence. The term "entrance angle" is used to denote the angle of incidence, measured from an axis normal to the base surface of the sheeting, of light incident on the sheeting. See, e.g. ASTM Designation: E 808-93b, Standard Practice for Describing Retroreflection. Retroreflective sheeting for signing applications is typically designed to exhibit its optimal optical efficiency at relatively low entrance angles (e.g. approximately normal to the base surface of the sheeting). See, e.g. U.S. Pat. No. 4,588,258 to Hoopman. Other applications such as, for example, pavement marking or barrier marking applications, require retroreflective sheeting designed to exhibit its maximum optical efficiency at relatively high entrance angles. For example, U.S. Pat. No. 4,349,598 to White ('598 patent), discloses a retroreflective sheeting design wherein the cube-corner elements comprise two mutually perpendicular rectangular faces disposed at 45 degrees to the cube-corner sheeting base and two parallel triangular faces perpendicular to the rectangular faces to form two optically opposing cube-corner elements. U.S. Pat. No. 4,895,428 (Nelson et al.) and U.S. Pat. No. 4,938,563 (Nelson et al.) disclose retroreflective sheeting wherein the cube-corner elements comprise two nearly perpendicular tetragonal faces and a triangular face nearly perpendicular to the tetragonal faces to form a cube-corner. The cube-corner elements further include a non-perpendicular triangular face. All of the aforementioned cube-corner sheetings would be expected to be useful in the articles of the present invention The manufacture of retroreflective cube-corner element arrays is typically accomplished using molds made by different techniques, including those techniques known as pin bundling and direct machining. Molds manufactured using pin bundling are made by assembling together individual pins that each have an end portion shaped with features of a cube-corner retroreflective element. U.S. Pat. No. 3,632,695 (Howell) and U.S. Pat. No. 3,926,402 (Heenan et al.) disclose illustrative examples of pin bundling. The direct machining technique, also known generally as ruling, comprises cutting away portions of a substrate to create a pattern of grooves that intersect to form structures including cube-corner elements. The grooved substrate is typically used as a master mold from which a series of impressions, i.e., replicas, may be formed. In some instances, the master itself may be useful as a retroreflective article. More commonly, however retroreflective sheeting or retroreflective articles are formed in a polymeric substrate using the master mold or using replicas of the master mold.

Direct machining techniques are a useful method for manufacturing master molds for small microcube arrays. Small microcube arrays are particularly beneficial for producing thin retroreflective sheeting that has improved flexibility. Microcube arrays are also more conducive to continuous manufacturing processes. The process of manufacturing large arrays of cube-corners is also relatively easy using direct machining methods rather than pin bundling or other techniques. An illustrative example of direct machining is disclosed in U.S. Pat. No. 4,588,258 (Hoopman).

Master molds suitable for use in forming cube-corner sheeting may be formed using direct machining techniques as described above. However, the cube-corner geometries disclosed in these patents require two different machining tools to produce a master mold. This reduces the efficiency of the master mold manufacturing process. Additionally, master molds manufactured according to these patents comprise surfaces that extend substantially perpendicular to the base surface of the master mold. Such perpendicular surfaces can be detrimental to the process of producing exact replicas of the master mold.

It is believed that all cube-corner sheetings discussed in the aforementioned patents would be useful in the articles of the present invention. Other microstructured retroreflective substrates which have projections other than cube-corners would also be useful in the articles of the invention The substrates useful according to the invention may optionally have one or more of the following optical characteristics: retroreflectivity, total internal reflection, and partial internal reflection. These include refractive and/or diffractive properties, for example. The microstructured substrate itself can have specular or diffusive properties to improve the detectability of the fluid as it moves on the microstructured substrate. As the fluid moves on the microstructured substrate, it wets the microstructured surface, causing the refractive index difference between the microstructured surface and adjacent fluid to decrease (compared to air), resulting in frustration of the optical characteristics of the microstructured substrate and improving its transparency.

The substrate may be formed as a discrete material having its own separate backing layer and may be adhesively bonded in an article of the invention. Optionally, the substrate may be formed as a part of another layer of the article, for example, a microstructured substrate may be molded in the bottom surface of the top cover of an article of the invention. This may provide advantage in manufacturing articles of the present invention as a separate substrate does not have to manufactured, cut, and adhesively mounted to the top cover.

A second class of substrates may be described as those having channels that are random in size and shape and include porous or wicking materials typically used in separations as filters or membranes and would be composed of natural, polymeric and inorganic materials such as paper and other natural fibers, cellulose nitrate, cellulose acetate, polypropylene, polyethylene, polyvinylidene fluoride, polytetrafluoroethylene, bisphenol polycarbonate and other polymeric materials, borosilicate glass and other inorganic glasses, silver and other metals. Additional useful substrates in this category would comprise woven materials made from natural and synthetic fibers and non-woven materials made from polymeric materials such as polypropylene, polyethylene and other polyolefins, natural and synthetic rubbers, polymers containing acrylates, and other polymers that could be melt blown. A preferred type is filter media such as filter paper.

A variety of fluids are useful according to the present invention. Examples thereof include, but are not limited to, those selected from the group consisting of viscous fluids, viscoelastic fluids, and mixtures thereof.

The surface tension of the fluid can vary. Typically the surface tension of the fluid at 23° C. ranges from about $10 \times 10^{-3}$ N/m to about $80 \times 10^{-3}$ N/m, preferably about $10 \times 10^{-3}$ N/m to about $60 \times 10^{-3}$ N/m, even more preferably about $10 \times 10^{-3}$ N/m to about $50 \times 10^{-3}$ N/m, and most preferably about $10 \times 10^{-3}$ N/m to about $40 \times 10^{-3}$ N/m.

The density of the fluid can vary. Typically the density of the fluid at 23° C. ranges from about 0.5 to about 2 grams/cc, preferably about 0.5 to about 1.5 grams/cc, and most preferably about 0.8 to about 1.5 grams/cc.

The zero rate shear viscosity of the fluid can vary. Typically the zero rate shear viscosity of the fluid at 23° C. ranges from about $1 \times 10^{-3}$ to about $1 \times 10^{6}$ Pa·s, preferably about 0.1 to about $1 \times 10^{5}$ Pa·s, and most preferably about 1 to about 10,000 Pa·s.

For time/temperature indicator articles of the invention, the fluid selected is preferably temperature sensitive. For timer articles of the invention, the fluid selected is preferably substantially temperature insensitive, most preferably temperature insensitive. Temperature sensitive fluids are defined as having an activation energy ($E_a$) of 3 kcal/mole or more and a $Q_{10}$ of preferably greater than 1.1. Temperature insensitive fluids are defined as having an $E_a$ of less than 3 kcal/mole and preferably a $Q_{10}$ of 1.1 to 1.0. $E_a$ may be determined from the Arrhenius relationship:

$$k = k_0 \exp(-E_a/RT)$$

where k=the rate constant as a function of temperature T (Kelvin);

$k_0$=the pre-exponential factor;

R=the ideal gas constant (1.99 Kcal/mole K); and $E_a$=the activation energy in Kcal/mole.

$Q_{10}$ may be determined according to the following formula wherein T is provided in ° C.:

$$Q_{10} = (\text{Rate of change at } T+10° \text{ C.})/(\text{Rate of change at } T).$$

The fluid selected for use in an article of the invention is preferably innocuous and non-reactive with the other components of the article with which it may come in contact. If the article is to be used in contact with food products, it should meet all relevant laws and regulations for such a product. Examples of useful relatively innocuous and non-reactive fluids include, but are not limited to, the following: silicone fluids such as polydimethylsiloxane fluids, saturated hydrocarbon-based oils, silicone oils and gums, mineral oils, glycerols, water, and aqueous based fluids.

The fluid may or may not be colored depending on the embodiment employed. In an embodiment where the substrate is retroreflective (or in other applications where the substrate may have the optical characteristics discussed previously herein), the fluid is typically clear and colorless and, as the fluid fills the channels, it causes the total internal reflection to become frustrated (that is the substrate that appeared opaque now appears clear in those areas where the channels are filled, allowing a viewer to observe the colored cover layer below). Preferably the fluid has an index of refraction within about 0.4 of the index of refraction of the microstructured substrate surface (preferably the entire microstructured substrate) more preferably substantially the same, and most preferably the same as the microstructured substrate (preferably the entire microstructured substrate). However, the exact nature of the fluid can vary as long as, when it is used in an application where it is intended to render the substrate transparent, it does so sufficiently so one can identify the fluid flow front by, for example, viewing any color and/or graphics beneath the substrate.

When the substrate is not retroreflective or when the substrate is retroreflective but one does not intend to use it in a manner that causes it to become transparent, the fluid typically contains pigment(s) and/or dye(s) (such as blue organic dye, for example) and the substrate is selected to provide a contrast to the fluid flow (such as a white opaque substrate, for example).

The selection of the fluid and the substrate and the positioning thereof in the article should be sufficient to allow an observer to view the progress of the fluid over time as it migrates through the channels of the substrate. Depending on the particular embodiment of the article of the invention an observer may find that the fluid is more readily visible by changing the viewing angle. One can readily manipulate the article or change ones position to find the preferred viewing angle.

Suitable fluids according to the present invention include, for example, viscoelastic and viscous fluids and combinations thereof that provide the desired properties for migration into the channels of the microstructured surface in response to time and/or cumulative thermal exposure. For capillary action to primarily drive the migration of the fluid into the channels of the microstructured substrate, the surface energies of the article components should preferably cause the local contact angle of the fluid on the microstructured surface of the substrate to be less than about 90 degrees, more preferably less than about 25 degrees, within the range of intended use temperatures. The contact angle is a function of the surface energy of the microstructured surface, the surface energy of the fluid (e.g. liquid), and the interfacial energy between the two.

A viscous material can be defined by analogy to classic viscous fluids. If an external stress is applied to a viscous fluid, it will deform and continue to deform as long as the stress is present. Removal of the stress will not result in a return of the fluid to its undeformed state. Such a response is called viscous flow and defines a viscous material or fluid. When there is a direct proportionality between the stress and the rate of deformation in a viscous fluid, the fluid is a Newtonian fluid. There are also viscous fluids that are non-Newtonian and which exhibit a non-linear dependence between the stress and the rate of deformation.

Materials that exhibit both elastic and viscous properties simultaneously are called viscoelastic materials. Elastic properties can be explained with reference to classic elastic solids. Elastic solids respond to external stress by deforming and, upon removal of the stress, respond by returning to their original shape. Such a response is called elastic. Some elastic materials exhibit a direct proportionality between the stress and the deformation, thereby conforming to what is known as Hooke's Law. There are also elastic materials that do not obey Hooke's Law and that exhibit a non-linear relationship between stress and deformation. Viscoelastic materials are sometimes classified as either viscoelastic solids, i.e., elastic solids that exhibit some viscous effects during deformation, or viscoelastic liquids, i.e., viscous liquids that exhibit some elastic effects. A viscoelastic liquid can be identified as a viscoelastic material that continues to deform indefinitely when subjected to a shearing stress.

A viscoelastic material may exhibit a transition from an immobile, glassy state to a viscoelastic liquid state at a temperature known as the glass transition temperature, $T_g$. It may also exhibit a transition from a partially crystalline state to an amorphous state at the temperature at which the crystalline material melts, $T_m$. Often, such a material will behave as a viscoelastic solid below $T_m$. For a further discussion of the properties and analysis of viscoelastic materials, reference is made to John D. Ferry, *Viscoelastic Properties of Polymers*, (John Wiley & Sons, Inc. 1980). Fluids selected for use in the articles of the invention should preferably have $T_g$s and $T_m$s below the temperatures at which the article of the invention is intended for use.

In a timer article of the present invention, when a viscoelastic material has been selected for use, it is preferred to use a viscoelastic liquid exhibiting small elastic effects, such that it behaves essentially as a viscous fluid in a liquid state at all anticipated temperatures to which the article of the invention will be exposed.

In the time-temperature indicator device of the present invention, the fluid is preferably in a liquid state (most preferably a viscoelastic liquid state) at all anticipated temperatures to which the object to be monitored and, thus, the article of the invention will be exposed. This can be accomplished by choosing a fluid that has all such thermal transitions at temperatures below the anticipated range of temperatures to which the object to be monitored and, thus, the article of the invention will be exposed. This allows for an indicator that will be in its activated state upon contacting the fluid with the microstructured channels of the substrate. This also allows the fluid to migrate into the channels throughout the entire anticipated temperature range. In this manner, the indicator will be able to provide continuous integration of time-temperature exposure over the entire range of temperatures to which the object to be monitored and, thus, the article of the invention is to be exposed. It is also preferable that the fluid be able to migrate into the channels at any temperature at which appreciable degradation or other change can occur in the product being monitored.

Although viscoelastic liquid materials are preferred in the present invention, it is possible for some viscoelastic solid materials to function, provided the modulus of the material is low enough for it to deform and penetrate entirely through the microstructured channels under the influence of capillary action or other driving forces present in the device. These solids that can function as fluids by flowing within the channel substrates are considered to fall within the definition of "fluid" as used herein.

A solid (such as a viscoelastic solid, for example) with a crystalline or glassy continuous phase would not perceptively migrate into the channels, or if it did, it would be at such a slow rate as to not be practical for providing a visual indication of cumulative thermal exposure. However, at temperatures above the crystalline melting point or the glass transition temperature of the material, it would become a fluid and capable of migrating in the channels. Such materials are desirable for certain types of temperature monitoring applications, especially those in which the product undergoes degradation only above a critical threshold temperature.

An illustrative, but by no means exclusive, list of viscoelastic and viscous materials that may be suitable for use in the articles of the present invention includes natural rubber; butyl rubber; polybutadiene and its copolymers with acrylonitrile and styrene; polyalpha-olefins such as polyhexene, polyoctene, and copolymers of these and others; polyacrylates; polychloroprene; polydimethylsiloxane; silicone oils and gums; mineral oils; and block copolymers such as styrene-isoprene block copolymers; and mixtures of any of the above. Materials that undergo a melting or glass transition to change from solid to liquid behavior and which could be useful in the present invention include hydrocarbon waxes, elastomer/tackifier blends, etc.

The viscoelastic materials may, for example, comprise elastomers conventionally formulated as pressure sensitive adhesives. Examples thereof include, but are not limited to, polyisoprene, atactic polypropylene, polybutadiene, polyisobutylene, silicone, ethylene vinyl acetate, and acrylate based elastomers and can typically include a tackifying agent and/or a plasticizing agent.

Monomers useful in making fluids useful in the articles of the invention include, but are not limited to, those that have a homopolymer glass transition temperature less than about 0° C. Useful alkyl acrylates include, but are not limited to, unsaturated monofunctional (meth)acrylic acid esters of non-tertiary alkyl alcohols having from 2 to 20 carbon atoms in the alkyl moiety, preferably from 4 to 18 carbon atoms, and more preferably from 4 to 12 carbon atoms. Examples of useful alkyl acrylate monomers include, but are not limited to, n-butyl acrylate, hexyl acrylate, octyl acrylate, isooctyl acrylate, 2-ethylhexyl acrylate, isononyl acrylate, decyl acrylate, dodecyl acrylate, lauryl acrylate, octadecyl acrylate, and mixtures thereof.

An example of an optional reinforcing co-monomer is a monoethylenically unsaturated monomer having a homopolymer glass transition temperature greater than about 25° C. and is preferably co-polymerized with the acrylate monomers. Examples of useful co-polymerizable monomers include, but are not limited to, meth(acrylic) acid, N-vinyl pyrrolidone, N-vinyl caprolactam, substituted (meth)acrylamides such as N,N,-dimethyl acrylamides, acrylonitrile, isobornyl acrylate, and mixtures thereof. When a co-polymerizable monomer is used, the alkyl acrylate is typically present in the composition in amounts from about 50 to 99 parts by weight and the co-polymerizable monomer is typically present in corresponding amounts from 50 to 1 parts by weight, wherein the total amount by weight is 100.

The elastomer can optionally include a tackifier and/or plasticizer in a tackifier to elastomer base weight ratio or a plasticizer to elastomer base weight ratio of typically up to about 2:1. Suitable tackifiers include, but are not limited to, hydrogenated rosin esters commercially available as Foral 85™, Foral 105™, or Abitol™E and hydrocarbon tackifiers such as Regalrez™, all available from Hercules Incorporated of Wilmington, Del. Suitable plasticizers include, but are not limited to, hydrocarbon oils such as Shellflex™ (available from Shell Chemical Co., Houston, Tex.), USP grade mineral oil, and phthalates including alkyl phthalates such as dioctyl phthalate, diisononyl phthalate, and allyl phthalates.

The article of the invention is preferably designed to provide sufficient fluid to fill the channels of the microstructured surface as the fluid migrates along the channels. The article components should also preferably be chosen to provide a desired rate of migration of the fluid into the channel structure of the microstructured substrate. In a time indicator, the fluid such as a viscous liquid, for example, should preferably migrate through this channel structure at a rate that is essentially independent of temperature. By controlling the properties of the liquid, the indicating device can be constructed to provide a visually observable indication of the time expired. Accordingly, it is desirable to be able to select a liquid having suitable characteristics for the amount of time that needs to be monitored.

In a time-temperature indicator, the fluid such as a viscoelastic liquid for example, preferably migrates through the channel structure at a rate that preferably increases with temperature in a sufficiently similar way to the change in decay rate of the object to be monitored to provide a suitable time-temperature indicator. By selecting a fluid with the appropriate properties, the indicating device can be constructed to provide a visually observable indication of a predetermined cumulative thermal exposure. It will often be useful to provide an indication of a predetermined allowable cumulative thermal exposure for a particular perishable item, such as food, medicine, photographic supplies, and vaccines. Accordingly, it is desirable to be able to select a fluid having suitable characteristics for the particular product to be monitored.

As discussed above, $Q_{10}$ and $E_a$ are useful as a quantification of rate of degradation or other rate of change of an object to be monitored. It is also useful to quantify the effective $E_a$ or $Q_{10}$ of the fluid so as to select a suitable fluid for the object to be monitored. As with the particular object to be monitored, it is possible to select various fluids and perform experiments on indicators comprising the fluids to determine the rate of change of the visually observable indication at various temperatures for each fluid. It is then possible to calculate a measured effective $E_a$ and/or $Q_{10}$ for various fluids with a given substrate to best fit the intended use of the indicator. It is also possible to measure the temperature dependence of the flow properties of the fluid independently and estimate the effective activation energy.

For example, one can measure the dynamic mechanical properties of a fluid as a function of frequency at various temperatures and perform time-temperature superposition according to classical procedures known in the art of rheology. The temperature dependent shift factors that result can be fit to the Williams-Landel-Ferry equation and the effective activation energy can then be calculated according to the well-known equation of Ferry. See John D. Ferry, *Viscoelastic Properties of Polymers*, (John Wiley and Sons, Inc, 1980). One skilled in the art of rheology would be able to use the equation of Ferry as described. Any of a number of other rheological properties could be measured such as creep compliance, dynamic viscosity, etc. and their temperature dependence could be used by one skilled in the art of rheology to estimate the effective activation energy.

Many fluids useful in the articles of the invention have an $E_a$ that varies somewhat with temperature. In that case, an average or effective $E_a$ over a temperature range can be calculated. Correspondingly, the $Q_{10}$ value of the fluid for a particular increase in temperature, for example from 20° C. to 30° C., would be expected to be somewhat different from the $Q_{10}$ value for an increase in temperature from 30° C. to 40° C. Nonetheless, the $E_a$ and $Q_{10}$ has been observed to vary with temperature by a small enough amount that the viscoelastic or viscous materials are still useful as an accurate integrator of temperature over time to provide an accurate indication of predetermined allowable thermal exposure. Furthermore, the $E_a$ becomes less sensitive to temperature change as temperatures increase above the $T_g$. An effective $E_a$ over a given temperature range can be calculated for each fluid. The fluid can then be chosen to provide an indication of a predetermined thermal exposure for a given object to be monitored. One skilled in the art of rheology can readily determine the $E_a$ or $Q_{10}$ for a particular fluid.

Another property of the indicator that has been observed to influence the suitability of the indicator for a particular application is the runout time. This is the period of time it takes for migration of the fluid to fill the channels of the microstuctured surface and provide the visually observable indication. This is the point at which the leading front (i.e. the fluid flow front) of the migrating fluid reaches a predetermined distance along the channels of the microstructured surface. The fluid selected, the characteristics of the channels formed by the microstructured surface, and the length of these channels can affect the runout time of a particular indicator.

By selecting a fluid with the desired effective $E_a$ or $Q_{10}$ and the fluid and microstructured substrate combination with the desired runout time, it is possible to provide an indication of cumulative thermal exposure for a particular perishable item. Similarly, it would also be possible to provide an indication of cumulative time for a process or task being monitored.

The following general observations have been made with respect to the fluids useful in the articles of the invention. Values of effective $E_a$ from about 3 kcal/mole to about 70 kcal/mole have been observed in the fluids described herein. Materials with an $E_a$ of about 3 kcal/mole or less, which are particularly suitable for time indicators may, for example, comprise formulated fluids primarily composed from polydimethylsiloxanes and similar silicone fluids. Materials with an $E_a$ larger than about 3 kcal/mole are particularly suited for use in time-temperature indicators and encompass, for example, viscoelastic materials as discussed above. In such viscoelastic materials, it has been observed that the choice of elastomer is a primary factor in determining the effective $E_a$ for a particular viscoelastic material. For instance, 100% isooctyl acrylate (IOA) elastomers have an $E_a$ in the range of about 12–20 kcal/mole over the temperature range of 0° C. to 50° C.

Adding increasing amounts of tackifier generally raises the glass transition temperature and the effective $E_a$ of the elastomer. Adding plasticizer generally decreases the glass transition temperature and effective $E_a$ of the elastomer. By selecting particular viscoelastic materials, and by providing various amounts of tackifier and/or plasticizer, the migration characteristics of the viscoelastic material can be controlled. The fluid is preferably in its amorphous liquid state to at least below 50° C., more preferably below 20° C., still more preferably below 0° C., yet more preferably below −20° C., and most preferably to at least below −40° C. The fluids described herein typically have glass transition temperatures falling within a range of from about −130° C. to 10° C. Some of the fluids described herein remain useable to temperatures at least as high as 100° C., and it may be possible to formulate materials useful to temperatures as high as 200° C. or higher.

Articles of the present invention include a first fluid reservoir and a second fluid reservoir. Prior to activation of the article, the first reservoir is at least partially filed with a fluid. Prior to activation of the article, the second reservoir is empty. Upon removal of the barrier, the first reservoir is in fluid communication with the second reservoir which is in fluid communication with the substrate. In this way, fluid initially present in the first reservoir flows from the first fluid reservoir into the second fluid reservoir where it contacts at least one of the channels of the substrate. In certain embodiments, the volume of the second reservoir is equal to or greater than (preferably greater than) the volume of the first reservoir.

In one embodiment of the present invention the second reservoir is compression resistant. As used herein the term "compression resistant" refers to a reservoir that does not substantially deform and/or change volume upon application of an external force. Compression resistant reservoirs may be formed, for example, of compression resistant tubing made of glass, polymer, metal, and the like. Typically, the tubing will have a single inner passageway for the flow of fluid, although tubing having more than one inner passageway is also within the scope of the present invention. The inner passageway of the tubing should be appropriately sized to provide a capillary pressure when the tubing is in contact with the fluid that is less than the capillary pressure in the channels of the microstructured substrate. In this way, if an external force is applied to the article, the fluid will preferentially flow through the second reservoir rather than causing an increased flow rate of the fluid through the channels of the microstructured substrate. As used herein the term "capillary pressure" ($P_c$) refers to the pressure drop $\Delta P$ needed to achieve a capillary rise h of the fluid and is given by:

$$\Delta P = P_c = (2 * \gamma * \cos \theta * h)/a^2$$

where: $\gamma$ is the surface tension of the fluid,
$\theta$ is the contact angle the fluid makes with the capillary material (i.e. the channel material); and
a is the capillarity constant as defined by Adamson in Physical Chemistry of Surfaces (4$^{th}$ Edition, page 12).
The capillary pressure can be measured by using the Capillary Rise Method also described by Adamson in Physical Chemistry of Surfaces (4$^{th}$ Edition at page 17). Typically, the ratio of the capillary pressure in the microstructure channels to the capillary pressure in the second reservoir is about 1:1 or greater, more preferably about 2:1 or greater, more preferably about 5:1 or greater, and most preferably about 10:1 or greater.

The fluid preferably remains separated from the substrate until activation of the article is desired. To activate the article, a manipulation is performed on the indicator such that the fluid is allowed to flow from the first fluid reservoir into the second fluid reservoir where it contacts at least one of the channels of the substrate. Prior to activation, the article can be stored almost indefinitely. The fluid is preferably separated from the second reservoir and the substrate, for example, by a physical barrier that must be removed or ruptured in order to activate the article. Alternatively, the fluid may be separated from second fluid reservoir and the substrate by merely a space. The separation by merely space is useful for an article that may be a movement indicator that activates when the article is moved by lifting, tilting, and/or inverting, for example, thereby placing the fluid in contact with the substrate channels.

The use of a physical barrier is advantageous for articles that should not become activated by the position of the article. Use of a barrier requires a step such as penetrating, rupturing, or removing the barrier, for example, to allow the fluid to flow into the second reservoir and contact the substrate. A number of fluid barriers may be used according to the invention. For example, the barrier may be a wall of the first reservoir in which the fluid is contained. Upon applying pressure to the reservoir the barrier would rupture allowing the fluid to flow from the first reservoir into the second reservoir and to contact the substrate. Pressure may be applied, for example, by finger pressure. Other barriers include, for example, gates, valves, etc. These barriers could be manipulated or removed, for example, by pulling a tab, pulling a cord, removing a laminated seal, breaking a capsule, etc. to allow the fluid to flow from the first reservoir to the second reservoir and to contact the substrate. Other fluid reservoirs and barrier systems and methods of activation would be useful in the articles of the invention. The barrier could be made from a number of materials including but not limited to plastics, adhesives, metals, glass, etc.

In one embodiment, the barrier is formed by the use of an adhesion modifying material that is positioned under the top film between the first and second reservoirs. The adhesion modifying material lowers the adhesion between the film and the adhesive that the top film is bonded to in order to create a weak area that can be ruptured thereby allowing fluid to flow. Adhesion modifiers may comprise solvent or water borne systems of monomeric or polymeric materials that when coated provide a low energy surface. Examples include solvent borne systems of long-chain normal alkanes, long-chain fatty acids, long-chain alcohols, long-chain silanes, long-chain perflouroalkyl silanes, acids and perfluoroalkanes, that are solvent coated in an appropriate location of the indicator construction and allowed to dry to yield a weak boundary layer that would give preferential delamination at that location. Other useful adhesion modifiers would include release materials such as polyolefins, silicones, and fluorinated polymers that would be coated in place to form a low surface energy that allows delamination as desired. In addition, an adhesion modifier could also comprise a physical structure such as a matrix of posts, molded or otherwise created in an appropriate location of the indicator construction, whose function is to reduce the area of adhesive contact at an interface thus allowing for delamination to occur preferentially at that interfacial location.

When multiple substrates and/or multiple fluids are included in the article of the invention one may wish to use multiple barriers for the fluid(s). For example, each separate fluid may be contained by a separate first reservoir and may be separated from a separate second reservoir by a barrier.

If a solid is used that becomes a fluid upon exposure to heat it may be separated from the second reservoir and the substrate by one of the barriers described above, for example. Alternatively one may not wish to separate the solid from the substrate by a barrier and instead may rely on maintaining an appropriate temperature until activation is desired to prevent the resultant fluid from contacting the substrate. Also, the solid could be positioned such that, instead of contacting the substrate immediately upon melting, it is separated from the substrate by a space and does not contact the substrate until movement of the article occurs.

Articles of the present invention include a top film, which covers a portion or the entire article. Such a top film would typically cover a portion or all of any fluid(s), any solid(s), any reservoirs, barrier(s) and the substrate(s). The top film would typically also cover any colored or ink layer(s) that is contained in the article and that is intended to gradually appear and disappear, when viewed as the fluid flow progresses. The top film may be flexible, semi-rigid, or rigid. The top film is preferably chosen such that it does not interfere with the activation of the article and the flow of the fluid(s) along the fluid flow path(s). The top film preferably should be selected to prevent fluid(s) from leaking from the article. The top film can be made from a variety of materials, including, but not limited to, polymeric materials such as plastics. The top film may be a one-piece construction or may be a multiple-piece construction. The top film could be made of an opaque material provided with a transparent window through which to view the fluid progress, for example. Alternatively, the top film may be made from a transparent material with graphics thereon. A portion of the transparent cover should preferably be left free from graphics to provide a window to view the fluid progression. Other cover configurations are also possible.

The top film may optionally include one or more raised or indented features. For example, a raised protrusion (e.g., a hemispherical shaped protrusion) may be formed into the top film in order to provide a fluid reservoir when the top film is mounted to the article. A raised protrusion may form either the first or the second reservoir or both. In one embodiment, a second compression resistant reservoir is formed by forming an elongate "L"-shaped protrusion in the top film. The top film may also include a microstructured substrate of the type described hereinabove integrally formed into the bottom surface of the top film (see FIG. 3b).

The top film may be adhered to the substrate and other components of the article in a variety of ways including, for example, pressure sensitive adhesive, hot melt adhesive lamination.

One of the disadvantages of many presently known timers and time-temperature indicators is the effect known as "The Grey Time." Since many of these known indicators rely upon image appearance or color change, rather than a fluid flow front, to monitor the passage of time or the accumulated thermal history of the indicator, there is a period where the status of the indicator is subject to interpretation by the viewer. For example, for a known indicator that has an area to be monitored that simultaneously changes in its entirety from white to black goes through a period where the indicator becomes increasingly grey. The point where the indicator moves from the grey state to the black state, even if a reference color chart is placed on the indicator, is subject to interpretation of the viewer and, therefore, lacks a sharp transition time. This phenomenon is also present to some degree in similarly designed known indicators where a hidden message appears or a readable message disappears because all of these indicators are based upon diffusion. The present invention, however, uses a substrate with well defined channels that may be precisely and reproducibly made and, therefore, fluid flow through these channels is preferably accurate and reproducible.

The indication of the passage of time in the article of the current invention is provided by a fluid flow front. The readily detectable presence or absence of a fluid in the substrate channels minimizes "The Grey Time" phenomenon discussed above.

Preferably the fluid flow in an article of the invention can be viewed by an observer with an unaided eye (when the viewer has 20/20 vision or vision corrected to 20/20 vision).

A number of different techniques can be used to monitor the progress of fluid flow in the articles of the present invention. In articles of the present invention, the fluid flow may be monitored continuously during operation of the article or the fluid flow may be monitored at discrete and predetermined sections of the article through the use of small windows, slots, or other similar types of viewing apertures. For example, if an article is designed for use to indicate the passage of a given period of time only, a small window at the location on the substrate corresponding to the passage of that period of time may be all that is desired. In other instances, continuous monitoring of time or an indication of the time remaining until a milestone time is reached may be desirable. In that case several small windows or one larger window may be desirable for monitoring fluid flow.

If a substrate is not retroreflective or if the substrate is retroreflective, but designed for use in a manner that does not frustrate total internal reflection, a fluid to be used therewith most likely would contain dyes, pigments, and/or other coloration agents. As the fluid flows through the channels, the color-containing fluid front may be visually detected by contrast with, for example, a white substrate.

If the substrate is retroreflective, the progress of the fluid flow can optionally be monitored by observing the loss of total internal reflection in the retroreflective substrate as the fluid progresses through and fills the substrate channels. The presence of the fluid in the channels in close physical contact with the optical surface of the retroreflective substrate destroys the air interface necessary for total internal reflection to occur at the optical surface. As a consequence, as the fluid flows through the channels filling the air interface necessary for the total internal reflection, the total internal reflection is frustrated and the otherwise opaque channel containing substrate becomes transparent. A backing behind the retroreflective substrate can be colored to enhance the contrast between the regions where total internal reflection has been frustrated and regions where total internal reflection is operating or a message or messages including, for example, a bar coded message, may be printed on the backing to be revealed as the fluid flow progresses and the total internal reflection is frustrated. The concept of frustration of retroreflection is discussed in U.S. Pat. No. 5,959,777 and U.S. Pat. No. 5,999,307.

The article of the invention may optionally comprise a number of graphics. These may include, for example, an identification of what the article is and by whom the article is made, instructions on how to activate the article, and scales to help show the progress of the flow of fluid(s) over time and, thus, the amount of time elapsed. The units on the scale may be indicative of seconds, minutes, hours, days, weeks, months or years, for example, depending on the length of time the article is designed to be used for. Alternatively the scale could include symbols indicative of the elapsed time such as a plus, zero and minus along the fluid flow path, wherein a plus indicates much time remaining, zero represents a mid-point, and a minus indicates an end point.

These graphics would, in some cases, be applied to the covering of the article adjacent to the window(s) or even on the window(s) through which the fluid flow is viewed along the fluid flow path. In some articles wherein a substrate is retroreflective and the article functions by the frustration of total internal reflection with fluid flow, the inside cover of the backing beneath the substrate or the side of a substrate opposite the side having fluid flow therethrough could have a scale printed thereon. Alternatively a separate printed and/or graphics layers could be positioned on a side of a substrate opposite of the fluid flow such that it becomes apparent to an observer with fluid flow. Optionally transparent layers, such as an adhesive layer, could be used to bond such a layer to the substrate. Alternatively, symbols, a scale, words (such as "expired," "end," "finished," "replace," and "remove" etc.), etc. could be printed on the inside of the backing and appear to a viewer as the fluid progresses along the channels of a retroreflective substrate. Other uses and positioning of color, ink, and graphics are possible. Thus, graphics may appear on the article such that they remain during fluid flow, only become apparent with fluid flow, and/or vanish with fluid flow.

In some embodiments, one may wish to have printing on a non-structured surface of a substrate. For example, a v-shaped channel substrate, which is clear and not retroreflective, may have the word "fresh" printed on the substrate side opposite the channels. A colored fluid passing through the channels slowly obscures the word "fresh." When the word "fresh" is totally obscured, one knows that the expiration period has been reached. In this case, a structured substrate surface would typically be positioned closest to the window.

The articles of the invention can be used for a variety of purposes. The timer, for example, has the following potential uses. It can be used on items that are subject to degradation over time such as food, beverages, pharmaceutical products such as vaccines, medicines, vitamins, etc. It can also be used on or in conjunction with items that need to be replaced on a regular basis as a reminder that sufficient time has elapsed such that a replacement should be made. These items include, for example, filters, such as furnace filters and water filters; automotive oil; cleaning sponges; etc. These articles can also be used to time activities such as meetings, "time-outs" for children, medical tests, etc. The articles can also be used as a reminder for taking medicine or changing bandages, etc. For example, a potential use of a timer article would be on a transdermal patch that is intended to release a drug, such as a painkiller for example, through the skin of a patient. The timer article could be used to indicate when the patch had expired and needed to be replaced. Care should be taken that such articles are adequately tested before being used for medical, health, and/or safety uses and that they comply with all relevant laws and regulations. The timers could also be used on or in conjunction with parking permits, admission tickets, and visitor identification badges that are to have a set expiration time or date; game pieces; lottery tickets; invitations; calendars; announcements; greeting cards; reminders to clean, toss contents, change batteries; etc. The article could potentially be attached to an article to be monitored, such as a food item, carried by the user or positioned elsewhere, such as in a notebook, on a bulletin board, counter, car dashboard, etc.

Although game pieces, lottery tickets, invitations, announcements, and greeting cards may not have a scale that marks time passage on them, they would be designed to elapse in a certain period of time. Typically it would be long enough to build suspense (seconds or minutes), but not so long that the user of the article becomes bored waiting for the full message.

The articles of the invention are particularly useful for items where it would not be appropriate or feasible to use conventional timing devices. These timer articles could be applied, for example, by a consumer to packages of leftover food in a refrigerator. Timer articles could also be applied, for example, by a manufacturer, to a packages of food that retain their freshness, for example, seven days upon opening. The consumer could then activate the article upon opening.

This invention will be better understood by referring to the following figures.

FIG. 1a illustrates an embodiment of a timer article 2 of the present invention. Timer article 2 includes top film 4 that contains printing thereon, except for a rectangular window 6, which is left transparent to provide a window for a viewer to observe the flow of fluid through the channels of microstructured substrate 8 upon activation. The printing on the top film 4 includes scale 10 and activation instructions 12. The article 2 includes first reservoir 14 that is at least partially filled with fluid 16 and second reservoir 18, which is empty prior to activation of the article. Barrier 20 is located between first reservoir 14 and second reservoir 18 and prevents the flow of fluid 16 between the reservoirs prior to activation of the article 2. Second reservoir 18 is in fluid communication with microstructured substrate 8. Article 2 further includes vent hole 23 that allows air to escape from the article 2 as fluid flows down the microstructured substrate 8.

Figure 1B:
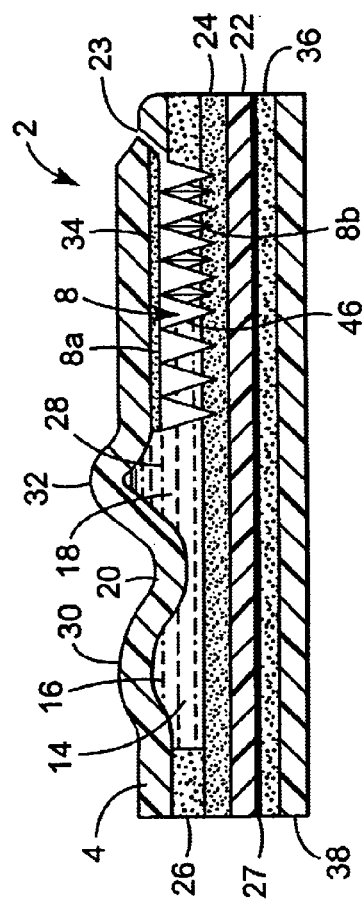

FIG. 1b is a cross-sectional view of the article of FIG. 1a taken along line 1b—1b. Article 2 includes clear base film layer 22 having adhered thereto a layer of pressure sensitive adhesive 24. Adhered to the pressure sensitive adhesive layer 24 is hot-melt adhesive layer 26. Hot-melt adhesive layer 26 is provided with a positioned cut-out 28. Adhered to the top surface of the hot-melt adhesive layer 26 is top film 4. Top film 4 forms a top seal on article 2 to prevent the loss of fluid from the article. Top film 4 includes a first hemispherical protrusion 30 and a second hemispherical shaped protrusion 32. First hemispherical protrusion 30 defines the top surface of first reservoir 14. Second hemispherical protrusion 32 defines the top surface of second reservoir 18. Together, top film 4, pressure sensitive adhesive layer 24, hot-melt adhesive layer 26 and base film layer 22 cooperate to form a housing around article 2. Microstructured substrate 8 is positioned under top film 4 and is adhered to top film 4 using a layer of pressure sensitive adhesive 24. The unstructured surface of the microstructured substrate 8 is identified as 8a and is positioned against pressure sensitive adhesive 34. The structured surface of the microstructured substrate 8 is identified as 8b and is positioned against pressure sensitive adhesive 34. Preferably, the structured surface 8b is at least partially embedded into pressure sensitive adhesive 24 in order to seal off the structured surface 8b.

The bottom of the base film layer 22 is shown coated with an optional pressure sensitive adhesive layer 36 that is useful, for example to adhesively bond the timer article 2 to a substrate. Pressure sensitive adhesive 36 is shown covered with an optional release liner 38 which is removed prior adhesively bonding the timer article to a substrate.

As shown in FIG. 1*b*, first reservoir 14 is at least partially filled with fluid 16. Prior to activation, first reservoir 14 is separated from second reservoir 18 by barrier 20. Barrier 20 is formed by adhesively bonding top film 4 to pressure sensitive adhesive layer 24. Second reservoir 18 is open to microstructured substrate 8.

FIG. 1*c* is a cross-sectional view of the article of FIG. 1*a* taken along line 1*c*—1*c*. As shown in FIG. 1*c*, hot melt adhesive layer 26 has cut-out 28 to provide a cavity for holding microstructured substrate 8. Hot melt-adhesive layer 26 preferably seals the edge of the microstructured substrate 8 so that fluid flowing through the channels of the microstructured substrate 8 does not leak out at the edge of the microstructured substrate.

FIGS. 1*a*' and 1*b*' are identical to FIGS. 1*a* and 1*b*, respectively except that activation has already occurred, for example, by the application of finger pressure to first reservoir 14. Activation causes barrier 20 to rupture by delaminating top film 4 from pressure sensitive adhesive 24 thereby allowing at least a portion of the fluid 16 to flow from first reservoir 14 into second reservoir 18 where the fluid 16 comes into contact with the microstructured substrate 8. As the fluid 16 fills in the channels of the microstructured substrate 8, it changes the optics of the microstructured substrate to render the formerly opaque microstructured substrate 8 clear. In this way, a layer of colored ink 27 coated on clear film layer 22 becomes visible to an observer looking through window 6. A colored bar 44 in FIG. 1*a*' shows the elapse of time. The edge of the bar 44, which moves over time, is identified as 46 and is also known as the fluid flow front. FIGS. 1*a*" and 1*b*" are identical to FIGS. 1*a*' and 1*b*', respectively, except that the colored bar 44 has moved entirely across the microstructured substrate 8 indicating that there is no more time left to run on the timer article 2.

FIG. 2*a* illustrates an embodiment of a timer article 50 of the present invention having a compression-resistant second reservoir. Timer article 50 includes top film 52 which contains printing thereon, except for a rectangular window 53, which is left transparent to provide a window for a viewer to observe the flow of fluid through the channels of microstructured substrate 56 upon activation. The printing on the top film 52 includes scale 58 and activation instructions 60. The article 50 includes first reservoir 62 that is at least partially filled with fluid 64 and second reservoir 66, which is empty prior to activation of the article. Second reservoir 66 is an "L" shaped tube. Barrier 68 is located between first reservoir 62 and second reservoir 66 and prevents the flow of fluid between the reservoirs prior to activation of the article 50. Second reservoir 66 is in fluid communication with microstructured substrate 56. Article 50 further includes vent hole 70 located at the end of second reservoir 66 and vent hole 71 located at the end of the microstructured substrate 56. Vent hole 71 allows air to escape from the article 50 as fluid flows down the microstructured substrate 56.

Figure 2D:
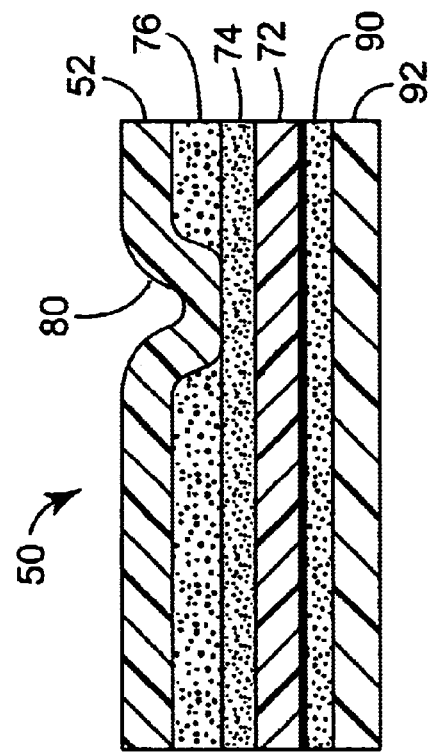
FIG. 2$a$ illustrates a top view of an embodiment of an article of the invention prior to activation.
Figure 2C:
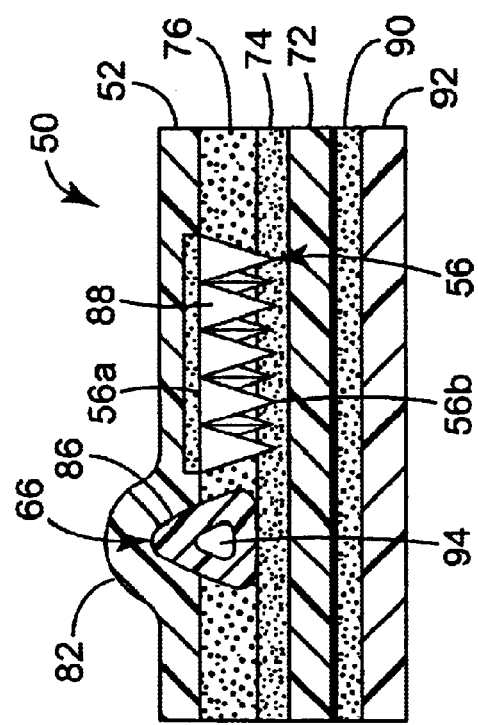

Referring now to FIGS. 2*b* and 2*c*, cross-sectional views of the article 50 of FIG. 2*a* taken along lines 2*b*—2*b* and 2*c*—2*c*, respectively, are shown. Article 50 includes clear base film layer 72 having adhered thereto pressure sensitive adhesive layer 74. Adhered to the pressure sensitive adhesive layer 74 is hot-melt adhesive layer 76. Adhered to the top surface of the hot-melt adhesive layer 76 is top film 52 that forms a top seal on the article to prevent the loss of fluid from the article. Together, top film 52, pressure sensitive adhesive layer 74, hot-melt adhesive layer 76 and base film layer 72 cooperate to form a housing around article 50. Top film 52 includes a first hemispherical protrusion 84 which forms the top portion of first reservoir 62. Top film 52 further includes an "L" shaped protrusion 82 for holding compression resistant tube 86 that forms compression resistant second reservoir 66. Hot-melt adhesive layer 76 is provided with two positioned cut-outs 78 and 80. Cut-out 78 provides a cavity for holding microstructured substrate 56. Cut out 80 (shown in phantom lines on FIG. 2*a*) is present to form a rupturable barrier between first reservoir 62 and second reservoir 66. Referring now to FIG. 2*d* a cross-sectional view of article 50 taken along lines 2*d*—2*d* to show the rupturable barrier between first reservoir 62 and second reservoir 66. Barrier 68 is formed by a cut-out 80 in hot-melt adhesive layer 76 which allows top film 52 to directly contact pressure sensitive adhesive layer 74 thereby forming a rupturable barrier between first reservoir 62 and second reservoir 66.

A layer of microstructured substrate 56 is positioned under top film 52 and is bonded to the cover with a layer of pressure sensitive adhesive 88. The unstructured surface of the microstructured substrate 56 is identified as 56*a* and is positioned closest to the window 54. The structured surface of the microstructured substrate 56 is identified as 56*b*. Preferably, the structured surface 56*b* is at least partially embedded into pressure sensitive adhesive layer 74. Most preferably, the structured surface 56*b* is embedded in pressure sensitive adhesive layer 74.

The bottom of base film layer 72 is shown coated with an optional pressure sensitive adhesive 90. Pressure sensitive adhesive 90 may be covered with optional release liner 92. The pressure sensitive adhesive 90 is useful, for example, to adhesively bond the article 50 to a substrate after removal of the release liner 92.

As shown in FIG. 2*b*, first reservoir 62 is at least partially filled with fluid 64. Prior to activation, first reservoir 62 is separated from second reservoir 66 by barrier 68. Second reservoir is formed of a compression-resistant tube 86 having an internal passageway 94 for carrying fluid. Referring now to FIG. 2*a*-1, a top view of article 50 having top film layer 52 removed is shown. Compression resistant tube 86 includes internal passageway 94 that connects inlet hole 96, feed hole 98 and outlet hole 99. Upon activation of article 50, inlet hole 96 is in fluid communication with first reservoir 62 through cut out 80 in hot melt adhesive layer 76. Feed hole 98 is in fluid communication with microstructured substrate 56 to allow fluid to flow from inlet hole 96 through internal passageway 94 through feed hole 98 where it contacts substrate 56. Outlet end 99 of tube 86 is in communication with vent hole 70 (see, FIG. 2*a*). Preferably, the length and the size of the internal passageway 94 of compression resistant tube 86 are selected to provide a volume in the tube that is equal to, more preferably greater than, the volume of fluid 64 contained in the first reservoir 62.

To activate article 50, pressure is applied to the first reservoir 62. The applied pressure causes top film 52 to separate from pressure sensitive adhesive layer 74 allowing at least a portion of fluid 64 to flow from first reservoir 62 through the path defined by the cut-out 80 into the inlet end 96 of compression resistant tube 86 of second reservoir 66. Once in the second reservoir 66, at least a portion of the fluid 64 flows through feed-hole 98 and contacts the microstructured surface 56*b* of the microstructured substrate 56 to activate article 50.

The internal passageway 94 of compression resistant tube 86 is sized so that the fluid has a lower capillary pressure in the compression resistant tube 86 than the fluid has when present in the channels of the microstructured substrate 56. In this way the fluid moves from the compression resistant tube 86 into the channels of the microstructured surface. Furthermore, vent holes 70 and 71 equalize pressure at the fluid/air interface in the compression resistant tube 86 and channels of the microstructured surface 56, respectively. This feature combined with the compression resistance of the reservoir and microstructured substrate, prevents the presence of an external force on the timer 50 from significantly affecting timing rate. The compression resistant tube 86 forming the second reservoir 66 is designed to support external loads anticipated during use of the article 50. This may be done by using stiffer or stronger materials for the compression resistant tube 86 and/or by using a tube material having a thicker wall.

FIGS. 2a' and 2b' are identical to FIGS. 2a and 2b, respectively except that activation has already occurred, for example, by the application of finger pressure to first reservoir 62. Activation causes barrier 68 to rupture thereby allowing at least a portion of the fluid 64 to flow from first reservoir 62 into second reservoir 66 where it comes into contact with the channels of microstructured substrate 56. As the fluid 64 fills in the channels of the microstructured substrate 56, it changes the optics of the system to render the formerly opaque microstructured substrate 56 clear such that a layer of colored ink 57 on clear base film layer 72 becomes visible to an observer looking through window 53. A colored bar 63 in FIG. 1a' shows the elapse of time. The edge of the bar 63, which moves over time, is identified as 65 and is also known as the fluid flow front. FIG. 2a" is identical to FIG. 2a' except that the colored bar 63 indicates that there is no more time left to run on the timer article 50.

FIG. 3a illustrates another embodiment of a timer article 100 of the present invention having a top film that includes integral microstructured surface and compression resistant second reservoir. Timer article 100 includes top film 102 that contains printing thereon, except for a rectangular window 104, which is left transparent to provide a window for a viewer to observe the fluid flow through the channels of microstructured surface 106 upon activation. The printing on the top film 102 includes scale 108 and activation instructions 110. Top film 102 includes first hemispherical protrusion 112 which forms the top surface of first reservoir 114. First reservoir 114 is at least partially filled with fluid 116. Top film 102 further includes an "L" shaped thermoformed protrusion 115 which forms the top surface of a compression resistant second reservoir 118. Second reservoir 118 is empty prior to activation of the article 100. Barrier 120 is located between first reservoir 114 and second reservoir 118 and prevents the flow of fluid from first reservoir 114 to second reservoir 118 prior to activation of the article 100. Top film 102 also includes an integral microstructured surface 106. Second reservoir 118 is in fluid communication with integral microstructured surface 106. Article 100 further includes vent hole 124 located at the end of second reservoir 118 and vent hole 125 located at the end of microstructured surface 108. Vent hole 125 allows air to escape from the article 100 as fluid flows down the microstructured surface 106.

Referring now to FIGS. 3b and 3c, cross-sectional views of the article 100 of FIG. 3a taken along lines 3b—3b and 3c—3c, respectively, are shown. Article 100 includes clear base film layer 126 having adhered thereto an adhesive layer 128. Adhered to the top surface of the adhesive layer 128 is top film 102 that forms a top seal on the article to prevent the loss of fluid from the article. Together, top film 102, base film layer 126, and adhesive layer 128 cooperate to form a housing for article 100. As discussed above, top film 102 includes a first hemispherical protrusion 112 that forms the top portion of first reservoir 114. Top film 102 further includes an "L" shaped protrusion 115 that forms the top portion of second reservoir 118. The lower surface of top film 102 includes integral microstructured surface 106. Preferably, the microstructured surface 106 is at least partially imbedded in the adhesive layer 128.

The bottom of base film layer 126 is shown coated with an optional pressure sensitive adhesive 130. Pressure sensitive adhesive 130 may be covered with optional release liner 132. The pressure sensitive adhesive 130 is useful, for example, to adhesively bond the article 100 to a substrate after removal of the release liner 132.

As shown in FIG. 3b, first reservoir 114 is at least partially filled with fluid 116. Prior to activation, first reservoir 114 is separated from second reservoir 118 by barrier 120. Barrier 120 is formed by positioning an adhesion modifying material 134 between top film 102 and adhesive layer 128 along a line connecting first reservoir 114 to second reservoir 118. The adhesion modifying material 134 reduces the adhesion level that would normally be present between the top film 102 and the adhesive layer 128, such that when an activation pressure is applied to first reservoir 114, top film 102 separates from the adhesive layer 128 following the adhesion modifying material 134. Second reservoir includes L-shaped protrusion 115 that is integrally formed in top film 102 defining internal passageway 136 for carrying fluid 116. Second reservoir 118 is preferably compression resistant. Preferably, the length and the size of the internal passageway 136 of second reservoir 118 are selected to provide a volume in the second reservoir 118 that is equal to, more preferably greater than, the volume of fluid 116 in the first reservoir 114.

To activate article 100, pressure is applied to the first reservoir 114. The applied pressure causes top film 102 to separate from adhesive layer 128 following the adhesion modifying material 134 and thereby allowing at least a portion of fluid 116 to flow from first reservoir 114 into the second reservoir 118. Once in the second reservoir 118, at least a portion of the fluid 116 contacts the microstructured surface 106 of top film 102 thereby activating article 100.

Preferably, the internal passageway 136 of the compression resistant second reservoir 118 is sized so that it has a lower capillary fluid pressure than the capillary fluid pressure present in the channels of the microstructured surface 106. In this way, if an external pressure is applied to article 100 after activation, the fluid 116 will respond to the external pressure by flowing through the passageway 136 of the compression resistant second reservoir 118 rather than flowing under the external pressure at a higher rate through the microstructured surface 106. This is advantageous because the time or time/temperature accuracy of the article 100 will be substantially unaffected by the application of external pressure.

FIGS. 3a' and 3b' are identical to FIGS. 3a and 3b, respectively except that activation has already occurred, for example, by the application of finger pressure to first reservoir 114. As the fluid 116 fills in the channels of the microstructured surface 106, it changes the optics of the system to render the formerly opaque microstructured surface 106 clear such that a layer of colored ink 138 on clear base film layer 126 becomes visible to an observer looking through window 104. A colored bar 140 in FIG. 3a' shows the elapse of time. The edge of the bar 140, which moves over time, is identified as 142 and is also known as the fluid flow front. FIG. 3a" is identical to FIG. 3a' except that the colored bar 140 indicates that there is no more time left to run on the timer article 100.

Figure 4:
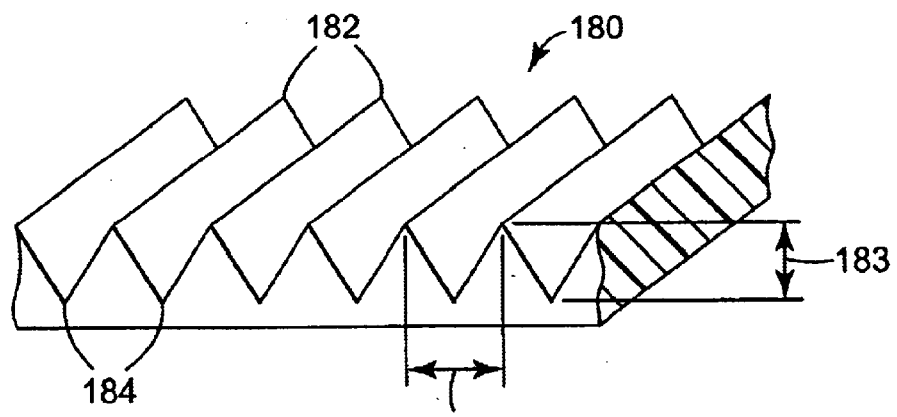
FIG. 4 illustrates a perspective view of an embodiment of a substrate, which is useful according to the present invention.

FIG. 4 illustrates one embodiment of a microstructured substrate 180 that is useful in an article of the invention. The substrate 180 has a series of parallel v-shaped channels 184. The peaks of the substrate 180 are identified as 182. Since the substrate 180 is not retroreflective, it would be used in a manner wherein a contrasting fluid flows through the channels of the substrate 180 such that the fluid is between the window of the article and the substrate 180. The channel width is identified as 181 and the channel depth is identified as 183.

Figure 5:
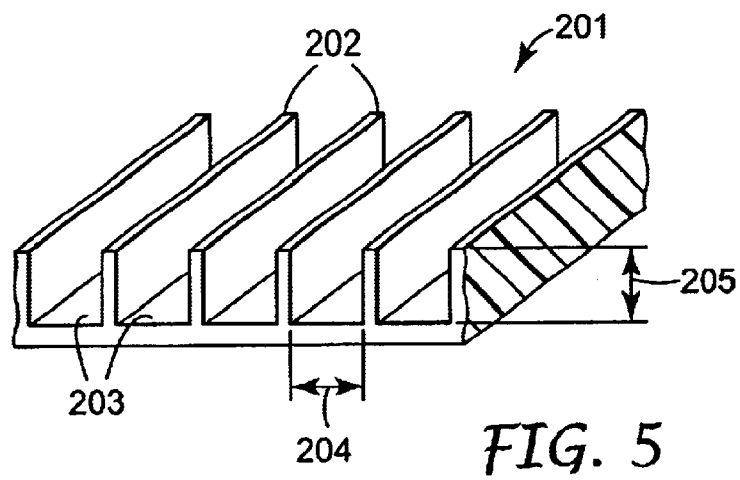
FIG. 5 illustrates a perspective view of another embodiment of a substrate, which is useful according to the present invention.

FIG. 5 illustrates another embodiment of a microstructured substrate 201 that is useful in an article of the invention. The substrate 201 has a series of square u-shaped channels. The bases of the channels are identified as 203. The sides of the channels are identified as 202. Since the substrate 201 is not retroreflective, it would be used in a manner wherein a contrasting fluid flows through the channels of the substrate 201 such that the fluid is between the window of the article and the substrate 201. The channel width is identified as 204 and the channel depth is identified as 205.

Figure 6:
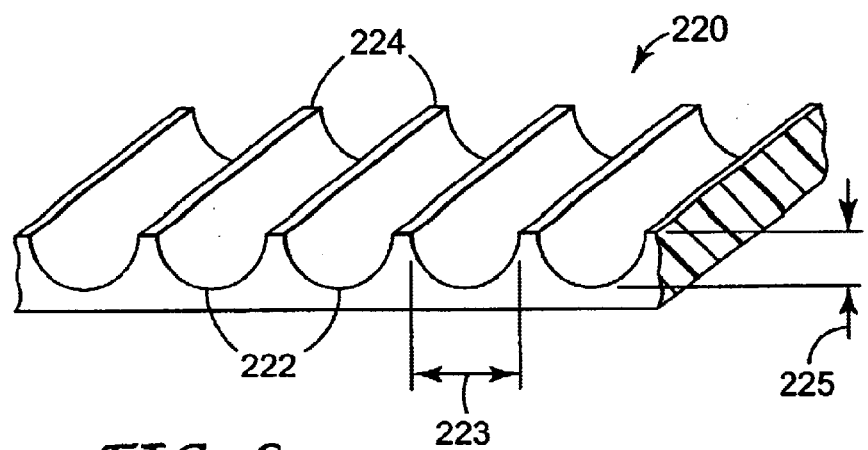
FIG. 6 illustrates a perspective view of another embodiment of a substrate, which is useful according to the present invention.

FIG. 6 illustrates a microstructured substrate 220 that is useful in an article of the invention. The substrate 220 has a series of semi-circle-shaped channels. The bases of the channels are identified as 222. The sides of the channels are identified as 224. Since the substrate 220 is not retroreflective, it would be used in a manner wherein a contrasting fluid flows through the channels of the substrate 220 such that the fluid is between the window of the article and the substrate. The channel width is identified as 223 and the channel depth is identified as 225.

Figure 7:
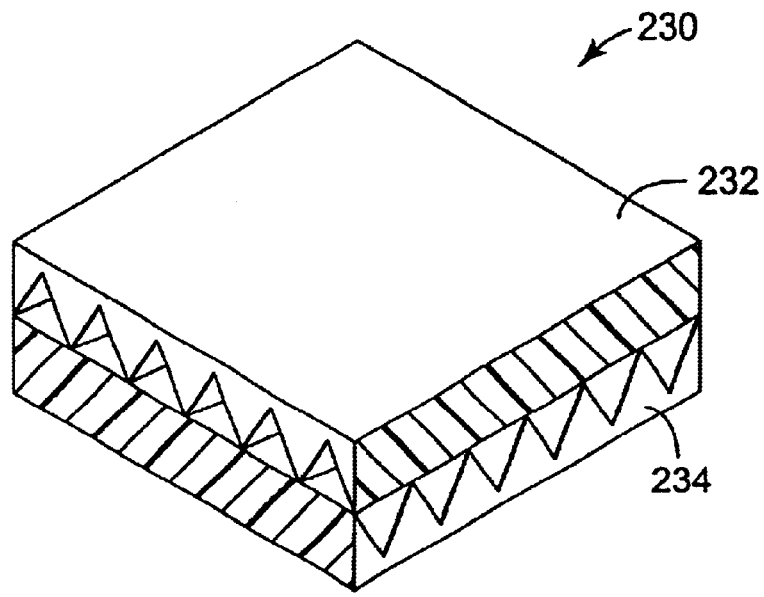
FIG. 7 illustrates a perspective view of another embodiment of a substrate, which is useful according to the present invention.

FIG. 7 illustrates a microstructured substrate 230 wherein the microstructured surface that the liquid is to migrate through and fill is internal to the substrate 230 and is formed by microstructured film 232 and microstructured film 234 that are joined together at their microstructured surfaces.

Figure 8A:
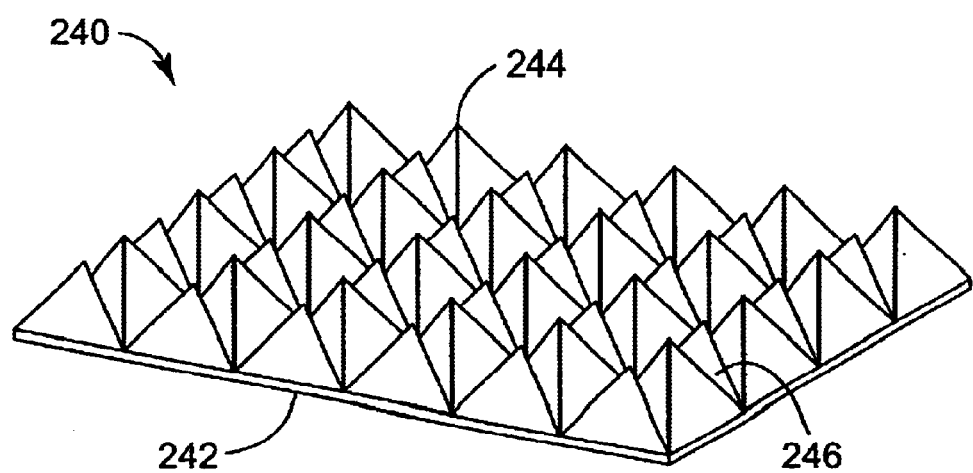
FIG. 8$a$ illustrates a perspective view of another embodiment of a substrate, which is useful according to the present invention.
Figure 8B:
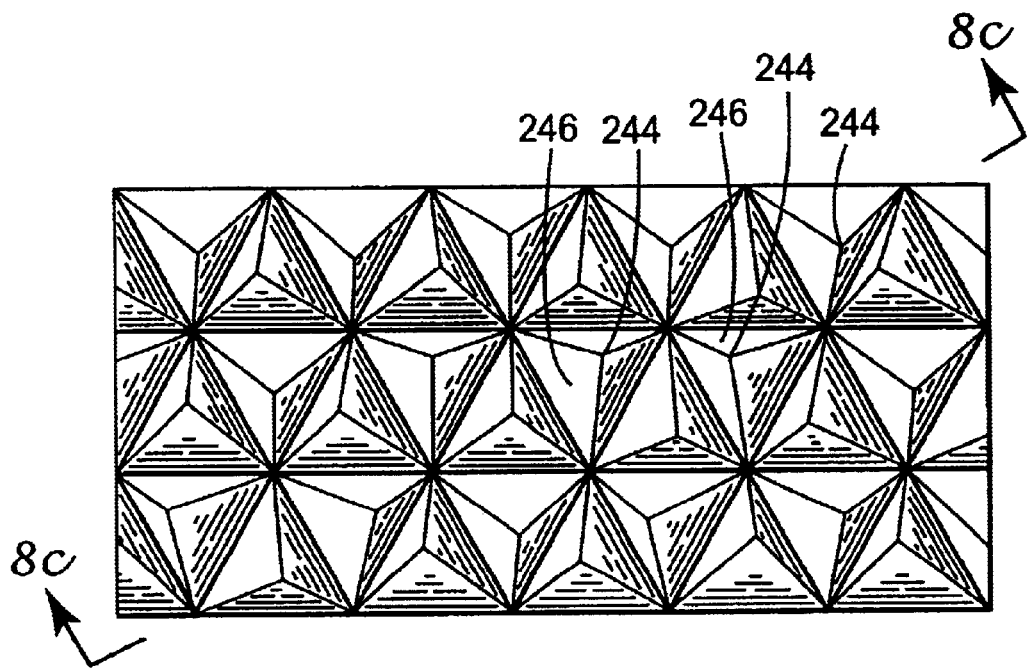
Figure 8C:
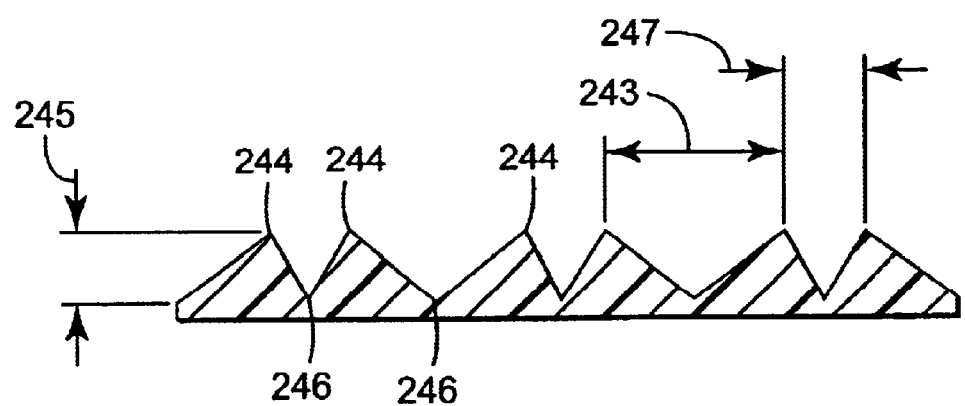

FIG. 8a illustrates a perspective view of a microstructured substrate that is useful in an article of the present invention. This microstructured substrate 240 that has a cube-corner pattern is a known material and is similar to the materials disclosed in U.S. Pat. Nos. 5,691,846; 5,450,235; and 4,588,258. The substrate 240 peaks are identified as 244 and the substrate 240 depressions, which form channels, are identified as 246. The smooth unstructured surface of the substrate 240 is identified as 242. FIG. 8b is a top plan view of the microstructured substrate of FIG. 8a. FIG. 8c is a cross-sectional view of the structured substrate of FIG. 8b taken along line 8c—8c. The depth of the channels is identified as 245. The widths of the wider channel portion are identified as 243 and the widths of the narrower channel portions are identified as 247. Even though the channels have differing widths in portions, the fluid flow front would still be relatively even due to the microstructured nature of the channels (that is, the regularity of the projections) and the interconnection of the channels, which help to regulate and maintain consistency of the fluid flow.

In order that the invention described herein can be more fully understood, the following examples are set forth. It should be understood that these examples are for illustrative purposes only, and are not to be construed as limiting this invention in any manner.

EXAMPLES

Table of Abbreviations

| Abbreviation | Description |
| --- | --- |
| Flexible Film-1 | ELVAX 260 film, 76.2 micrometers thick commercially available from I. E. duPont de Nemours & Co., Wilmington, DE |
| Flexible Film-2 | ELVAX 260 film, 254 micrometers thick commercially available from I. E. duPont de Nemours & Co., Wilmington, DE |
| Hot Melt Adhesive Film | THERMOBOND 560 film, 51 micrometers thick commercially available from 3M Company, St. Paul, MN, die cut to desired shape |
| Microstructured Film | DIAMOND GRADE 360 film, 89 micrometer microstructure height commercially available from 3M Company, St. Paul, MN coated with KRATON PSA-1 on the flat side to a thickness of 25 micrometers, die cut to desired shape |
| KRATON PSA-1 | A 50/50 blend of KRATON D1107 and ESCOREZ 1310 |
| KRATON PSA-2 | A 60/40 blend of KRATON D1107 and ESCOREZ 1310 |
| KRATON D1107 | Styrene-isoprene-styrene block copolymer commercially available from Shell Chemical, Houston, TX |
| ESCOREZ 1310 | tackifying resin commercially available from Exxon Chemical Company, Houston, TX |
| Double-coated Tape | A laminate of acrylic PSA (25 micrometers thick)/Polyester film (25 micrometers thick)/KRATON PSA-2 (25 micrometers thick)/release liner |
| Acrylic PSA | Acrylic pressure sensitive adhesive, containing a ratio by weight of 90/10/1 of isooctyl acrylate/acrylic acid/carbon black filler (see, for example Re 24,906 (Ulrich)). |
| Polyester Film | SCOTCHPAR clear film (25 micrometers thick), commercially available from 3M Company, St. Paul, MN, corona treated both sides |
| Release Liner | Silicone release liner from Loparex, Willowbrook, IL |
| Silicone Fluid 1 | Dow Corning 200 silicone fluid with a viscosity of 60,000 centiStokes, commercially available from Dow Corning, Midland, MI |
| Silicone Fluid 2 | Dow Corning 200 silicone fluid with a viscosity of 50 centiStokes, commercially available from Dow Corning, Midland, MI |
| Formed tube | Polyethylene tubing VWR P/N63018-805 of 1.6 millimeter inner diameter, 2.1 millimeter outer diameter commercially available from VWR, West Chester, PA of 4.1 centimeters in length with a triangular-shaped piece cut from the tube 1.3 centimeters from one end to allow the tube to be bent at a 90° angle without creating an obstruction. The tube was thermoformed into an L shape (with the missing triangular hole forming the 90° bend of the L), with both ends open and a feed hole was cut at the midpoint of the shorter leg. The tube was then placed in a thermoform jig to impart a triangular cross-section to the tube. |
| Wicking Medium | Whatman #40 filter paper die cut to a rectangular shape, commercially available from VWR, West Chester, PA |
| Adhesion Modifier | A 1 milliMolar solution of octadecyltrichlorosilane commercially available from Gelest Inc., Tullytown PA in heptane was applied with a dabber to the desired location and allowed to dry. |
| Integrated Top Film | Film prepared by forming a Flexible Film against a compression mold that imparts a blister, reservoir and microstructure to the film. |

Comparative Example C1

The Flexible Film-1 was vacuum formed on a rubber fixture creating depressions for the fluid blister, and the Microstructured Film. The Microstructured Film was bonded to the Flexible Film-1 with the KRATON PSA-1 on the flat side of the Microstructured Film. A vent hole was punctured in the Flexible Film-1 next to the Microstructured Film at the opposite side from the blister. The Hot Melt Adhesive Film was laid over the assembly, aligning its die cut with the microstructure and the blister. Silicone Fluid 1 was injected into the blister pocket using a dispensing pipette. Double-coated Tape was placed over the assembly with the Acrylic PSA side towards the Hot Melt Adhesive Film. The assembly thus formed was hot laminated at 75° C. for 10 seconds under a pressure of approximately 517 kiloPascals.

Example 1

The Flexible Film-1 was vacuum formed on a rubber fixture creating depressions for the fluid blister, the secondary reservoir, and the Microstructured Film. The Microstructured Film was bonded to the Flexible Film-1 with the KRATON PSA-1 on the flat side of the Microstructured Film. A vent hole was punctured in the Flexible Film-1 next to the Microstructured Film at the opposite side from the blister. The Hot Melt Adhesive Film was laid over the assembly, aligning its die cut with the microstructure and the blister. Silicone Fluid 1 was injected into the blister pocket using a dispensing pipette. Double-coated Tape was placed over the assembly with the Acrylic PSA side towards the Hot Melt Adhesive Film. The assembly thus formed was hot laminated at 75° C. for 10 seconds under a pressure of approximately 517 kiloPascals.

Example 2

The Flexible Film-1 was vacuum formed on a rubber fixture creating depressions for the fluid blister, the Formed Tube, and the Microstructured Film. The Microstructured Film was bonded to the Flexible Film-1 with the KRATON PSA-1 on the flat side of the Microstructured Film. The Formed Tube was placed in its depression. Two vent holes were punctured in the Flexible Film-1, the first next to the Microstructured Film at the opposite side from the blister and the second at the end of the Formed Tube at the opposite side from the blister. The Hot Melt Adhesive Film was laid over the assembly, aligning its die cut with the microstructure and the blister. Silicone Fluid 1 or Silicone Fluid 2 was injected into the blister pocket using a dispensing pipette. Double-coated Tape was placed over the assembly with the Acrylic PSA side towards the Hot Melt Adhesive Film. The assembly thus formed was hot laminated at 75° C. for 10 seconds under a pressure of approximately 517 kiloPascals.

Example 3

Samples of the label constructions prepared in Comparative Example C1 and Examples 1 and 2 were tested for timing accuracy by activating the timer by breaking the blister allowing the fluid to contact the microstructure surface and measuring the distance traveled by the fluid front in 168 hours. The average distance for the samples tested as well as the calculated coefficient of variance (COV) are shown in Table 1.

TABLE 1

| Construction Example | Number of Samples Tested | Average Distance Traveled by Fluid Front (centimeters) | COV |
| --- | --- | --- | --- |
| C1 | 9 | 2.83 | 6% |
| 1 | 27 | 2.27 | 12% |
| 2 | 25 | 2.63 | 11% |

Example 4

Samples of the label constructions prepared in Comparative Example C1 and Examples 1 and 2 were tested for activation failure or failure after activation. Activation failure includes the bursting of the pouch containing the fluid or an improper delamination of the Flexible Film-1 and KRATON PSA-1 or the Flexible Film-1 and the Hot Melt Adhesive Film. A catastrophic failure during timing is defined as premature stoppage of the fluid flow through the microstructure/PSA laminate leading to a discrepancy in timing accuracy six standard deviations smaller than that for a properly functioning label. The number of labels that either failed to activate properly or failed catastrophically after activation and during timing is shown in Table 2.

TABLE 2

| Construction Example | Number of Samples Tested | Activation Failures | Timing Failures | Percent Failure |
| --- | --- | --- | --- | --- |
| 1 | 29 | 11 | 13 | 83% |
| 2 | 22 | 2 | 0 | 9% |
| 3 | 40 | 0 | 0 | 0% |

Example 5

Samples of the label constructions prepared in Examples 1 and 2 were tested for timing accuracy while under a pressure load, by activating the timer by breaking the blister allowing the fluid to contact the microstructure surface and measuring the distance traveled by the fluid front in 168 hours while under a load of 0.2 kiloPascals. The average distance for the samples tested as well as the calculated coefficient of variance (COV) are shown in Table 3.

TABLE 3

| Construction Example | Number of Samples Tested | Average Distance Traveled by Fluid Front (centimeters) | COV |
| --- | --- | --- | --- |
| 1 | 4 | 2.97 | 18% |
| 2 | 3 | 2.70 | 7% |

Example 6

The Flexible Film-2 was vacuum formed on a rubber fixture creating depressions for the fluid blister, the Formed Tube, and the Wicking Medium. The Wicking Medium was bonded to the Flexible Film-2 with the KRATON PSA-1 on one side of the Wicking Medium. The Formed Tube modified as described in Example 2 was placed in its depression. Two vent holes were punctured in the Flexible Film-2, the first next to the Wicking Medium at the opposite side from the blister and the second at the end of the Formed Tube at the opposite side from the blister. The Hot Melt Adhesive Film was laid over the assembly, aligning its die cut with the microstructure and the blister. Silicone Fluid 1 or Silicone Fluid 2 was injected into the blister pocket using a dispensing pipette. Double-coated Tape was placed over the assembly with the Acrylic PSA side towards the Hot Melt Adhesive Film. The assembly thus formed was hot laminated at 75° C. for 10 seconds under a pressure of approximately 517 kiloPascals.

Examples 7–19

An Integrated Top Film, the composition of which is listed in Table 4 (thickness of each film was 250 micrometers except where noted), was compression molded under heat and pressure in a metal fixture to create simultaneously: depressions for the fluid blister and the secondary reservoir, and the microstructured channel system allowing fluid flow. The microstructure region formed has the same structure as the Microstructured Film. The Integrated Top Film was placed microstructure side up on a contoured rubber fixture that supports the relief of the Integrated Top Film. Silicone Fluid 1 or Silicon Fluid 2 was injected into the blister pocket of this Integrated Top Film using a dispensing pipette. The Adhesion Modifier was applied to the Integrated Top Film in the region between the blister and the reservoir where delamination is desired to occur for activation. Double-coated Tape was placed over the assembly with the Acrylic PSA side towards the Integrated Top Film. The assembly thus formed was hot laminated at 75° C. for 10 seconds under a pressure of approximately 517 kiloPascals. A vent hole was punctured in the Integrated Top Film next to the microstructured portion at the opposite end from the fluid filled blister. Another vent hole was punctured at the end of the reservoir at the opposite side from the blister.

TABLE 4

| Example | Film Material Used | Film Description and Manufacturer |
|---|---|---|
| 7 | Polyester | 102 micrometer thick SCOTHCHPAR film, commercially available from 3M Company, St. Paul, MN |
| 8 | Polypropylene | FORTILENE RG-7501, commercially available from BP Amoco, Houston, TX |
| 9 | Isotactic Polypropylene | CA244PC, commercially available from Basell North America Inc., Wilmington, DE |
| 10 | High Impact Polystyrene | STYRON 484, commercially available from Dow Plastics, Midland, MI |
| 11 | High Impact Polystyrene | STYRON 487, commercially available from Dow Plastics, Midland, MI |
| 12 | High Impact Polystyrene | STYRON 421, commercially available from Dow Plastics, Midland, MI |
| 13 | Ethylvinylacetate | ELVAX 260, commercially available from I. E. duPont de Nemours & Co., Wilmington, DE |
| 14 | Ethylvinylacetate | ELVAX 560, commercially available from I. E. duPont de Nemours & Co., Wilmington, DE |
| 15 | Ionomer | SURLYN 1857, commercially available from I. E. duPont de Nemours & Co., Wilmington, DE |
| 16 | Ionomer | SURLYN 1605, commercially available from I. E. duPont de Nemours & Co., Wilmington, DE |
| 17 | Ionomer | SURLYN 1650, commercially available from I. E. duPont de Nemours & Co., Wilmington, DE |
| 18 | Oriented Polystyrene | LABELFLEX, commercially available from Plastic Suppliers, South Chicago Heights, IL |
| 19 | Polycarbonate | MAKROFOL DE 1-1D, commercially available from Bayer Corp., Pittsburgh, PA |

The complete disclosures of the patents, patent documents, and publications cited herein are incorporated by reference in their entirety as if each were individually incorporated. Various modifications and alterations to this invention will become apparent to those skilled in the art without departing from the scope and spirit of this invention. It should be understood that this invention is not intended to be unduly limited by the illustrative embodiments and examples set forth herein and that such examples and embodiments are presented by way of example only with the scope of the invention intended to be limited only by the claims set forth herein as follows.

What is claimed is:

1. An article comprising:
   a housing enclosing:
   (a) a first fluid reservoir at least partially filled with a first fluid;
   (b) a substrate comprising a plurality of channels;
   (c) a second fluid reservoir in fluid communication with at least one channel of the substrate; and
   (d) a barrier located between the first fluid reservoir and the second fluid reservoir;
   wherein the article can be manipulated at a desired point in time by opening the barrier to allow at least a portion of the fluid to flow from the first reservoir to the second reservoir and to contact at least one channel of the substrate;
   wherein the article is designed to provide an indication of the progress of the fluid as it moves through the channels of the substrate; and
   wherein the second reservoir has a volume that is greater than a volume of the first reservoir, and is a sufficient to prevent the fluid from the first reservoir from being forced directly into the substrate upon opening the barrier.

2. The article of claim 1, wherein each fluid is selected from the group of viscous fluids, viscoelastic fluids, and combinations thereof.

3. The article of claim 1, wherein the substrate is cube-corner retroreflective sheeting.

4. The article of claim 1, wherein the substrate is retroreflective and wherein the progress of the fluid as it migrates through the channels of the substrate is evidenced by total internal reflectance in the retroreflective substrate.

5. The article of claim 1, wherein the article is a timer.

6. The article of claim 1, wherein the article is a time-temperature indicator.

7. The article of claim 1, wherein the substrate comprises a plurality of channels of random size and shape.

8. The article of claim 7, wherein the substrate is a web, fabric, porous material, porous paper or a porous membrane.

9. The article of claim 1, wherein the substrate comprises a microstructured surface comprising a plurality of channels having a predetermined size and shape.

10. The article of claim 9, wherein each channel is substantially identical to an adjacent channel or the substrate.

11. The article of claim 9, wherein the substrate is retroreflective.

12. The article of claim 1, wherein the second fluid reservoir is compression resistant.

13. The article of claim 12, wherein the second reservoir comprises a compression resistant elongated tube having an inlet opening, an internal passageway for the flow of fluid, a first outlet that is in fluid communication with the substrate, and a second outlet that is located proximate a vent hole.

14. The article of claim 13, wherein the second reservoir comprises a tube having an interior passageway for the flow of fluid and wherein the interior passageway is sized to provide a capillary pressure when in contact with the fluid that is less than the capillary pressure of the channels or the substrate when in contact with the fluid.

15. The article of claim 13, wherein the second reservoir comprises a tube comprising a material selected from the group consisting of glass, polymer, or metal.

16. The article of claim 1, wherein the housing comprises a top film and a base film that are adhered together with a layer of adhesive.

17. The article of claim 16, wherein the top film further comprises a scale that is positioned on a portion of the top film through which the progress of the fluid flow may be viewed and which extends in the direction of fluid flow.

18. The article of claim 16, wherein the top film further comprises a microstructured surface.

19. The article of claim 16, wherein the top film further comprises a raised protrusion that form a portion of a sidewall of the first fluid reservoir.

20. The article of claim 16, wherein the top film further comprises a raised protrusion that forms a portion of a sidewall of the second reservoir.

21. An article comprising:
   a housing enclosing:
   (a) a first fluid reservoir at least partially filled with a first fluid;
   (b) a substrate comprising a plurality of channels;
   (c) a compression resistant reservoir comprising an elongated tube having an inlet opening, an internal passageway for the flow of fluid, a first outlet that is in fluid communication at least one channel of the substrate, and a second outlet that is in communication with a vent hole; and
   (d) a barrier located between the first fluid reservoir and the inlet opening of the compression resistant reservoir;
   wherein the article can be manipulated at a desired point in time by opening the barrier to allow at least a portion of the fluid to flow from the first reservoir to the compression resistant fluid reservoir and to contact at least one channel of the substrate; and
   wherein the article is designed to provide an indication of the progress of the fluid as it moves through the channels of the substrate.

\* \* \* \* \*

UNITED STATES PATENT AND TRADEMARK OFFICE
CERTIFICATE OF CORRECTION

PATENT NO.    : 6,916,116 B2
DATED         : July 12, 2005
INVENTOR(S)   : Diekmann, Timothy J.

It is certified that error appears in the above-identified patent and that said Letters Patent is hereby corrected as shown below:

Column 5,
Line 65, delete "unshaped" and insert -- u-shaped --, therefore.

Column 30,
Line 48, after "is" delete "a".

Column 31,
Lines 5 and 21, delete "or" and insert -- of --, therefore.

Column 32,
Line 4, delete "form" and insert -- forms --, therefore.

Signed and Sealed this

Thirteenth Day of December, 2005

JON W. DUDAS
*Director of the United States Patent and Trademark Office*